United States Patent [19]

Chu et al.

[11] Patent Number: 5,539,744
[45] Date of Patent: Jul. 23, 1996

[54] HAND-OFF MANAGEMENT FOR CELLULAR TELEPHONY

[75] Inventors: Helen Chu, New York, N.Y.; Bharat T. Doshi, Holmdel, N.J.; Subrahmanyam Dravida, Somerset, N.J.; Sanjiv Nanda, Plainsboro, N.J.; Anil S. Sawkar, Bedminster, N.J.; Kazem A. Sohraby, Lincroft, N.J.

[73] Assignee: AT&T Corp., Murray Hill, N.J.

[21] Appl. No.: 395,546

[22] Filed: Feb. 28, 1995

Related U.S. Application Data

[63] Continuation of Ser. No. 323,995, Oct. 17, 1994, abandoned.
[51] Int. Cl.⁶ ........................................................ H04Q 7/20
[52] U.S. Cl. ...................... 370/60; 370/95.1; 379/60; 455/33.2
[58] Field of Search .......................... 370/60, 60.1, 94.1, 370/94.2, 95.1, 92; 379/59, 60, 63; 455/33.1, 33.2

[56] References Cited

U.S. PATENT DOCUMENTS 4,916,691  4/1990  Goodman ................................. 370/60
5,195,090  3/1993  Bolliger et al. ...................... 370/60 X

*Primary Examiner*—Melvin Marcelo
*Attorney, Agent, or Firm*—Jason P. DeMont

[57] ABSTRACT

A telecommunications architecture using ATM based technology is disclosed that supports wireless communications. Some embodiments of the present invention may provide a mechanism for hand-off, which has fewer costs and restrictions than other hand-off schemes the in the prior art. In one embodiment a plurality of virtual circuit identifiers is created such that each is unambiguously associated with the others. The virtual circuit identifiers are then transmitted to a wireless terminal, via a first radio port. Subsequently, the wireless terminal transmits one of the virtual circuit identifiers to second radio port.

3 Claims, 15 Drawing Sheets

ND-OFF MANAGEMENT FOR
CELLULAR TELEPHONY

CROSS-REFERENCE TO RELATED APPLICATIONS

This application is a continuation of application Ser. No. 08/323995, filed Oct. 17, 1994, entitled "Hand-Off Management for Cellular Services," which application is now abandoned.

FIELD OF THE INVENTION

The present invention relates to telecommunications systems architecture, in general, and more particularly, to a method for affecting hand-off in a cellular telecommunications system.

BACKGROUND OF THE INVENTION

FIG. 1 depicts a schematic diagram of a portion of a typical wireless communications system in the prior art, which system serves a number of wireless terminals that are situated within a geographic area. The heart of a typical wireless system is known as a Mobile Switching Center ("MSC") or, alternately, as a Mobile Telephone Switching Office ("MTSO"). Typically, the MSC is connected to a number of base stations, which are dispersed throughout the geographic area serviced by the system, and the local and long-distance telephone networks. The MSC is responsible for, among other things, routing or "switching" conversations between wireless terminals and between a wireless terminal and a wireline terminal, which is connected to the wireless system via the local and/or long-distance networks.

The geographic area serviced by the wireless system is partitioned into a number of spatially distinct areas called "cells." As depicted in FIG. 1, each cell is schematically represented by a hexagon; in practice, however, each cell usually has an irregular shape that depends on the topography of the terrain serviced by the system. Typically, each cell contains a base station, which comprises the antennas and radios that the base station uses to communicate with the wireless terminals and also comprises the transmission equipment that the base station uses to communicate with the MSC.

For example, when wireless terminal 111 desires to communicate with wireless terminal 112, wireless terminal 111 sends its data to base station 100, which relays the data to MSC 120. Upon receipt of the data, and with the knowledge that it is intended for wireless terminal 112, MSC 120 then returns the data back to base station 100, which relays the data, via radio, to wireless terminal 112. Although it may appear odd that the data must be transmitted from the base station to the MSC only to be returned, it is necessary when base station 100 does not have switching capability. In general, the link between the base station and the MSC carries a great quantity of data, and now that wireless systems are carrying substantially more video and high-speed data than they have in the past, it has become very important for the link to and from the base stations to be capable of efficiently carrying large quantities of data.

SUMMARY OF THE INVENTION

Embodiments of the present invention provide a mechanism for hand-off, which has fewer costs and restrictions than other hand-off schemes the in the prior art. In one embodiment a plurality of virtual circuit identifiers is created such that each is unambiguously associated with the others. The virtual circuit identifiers are then transmitted to a wireless terminal, via a first radio port. Subsequently, the wireless terminal transmits one of the virtual circuit identifiers to second radio port.

DETAILED DESCRIPTION

1. Introduction

For pedagogical reasons, the detailed description is partitioned into five sections. This section is an overview of the exemplary embodiment of the present invention, which preferably comprises an ATM based telecommunications network architecture that is advantageously capable of supporting both wireless and wireline telecommunications. Section II describes the logical subsystems that compose the exemplary embodiment. The message flows associated with wireless terminal registration, call origination and call termination in the exemplary embodiment are described in Section III. Section IV describes how the logical subsystems of Section II are grouped into functional modules in the exemplary embodiment, and Section V describes hand-off management in accordance with the exemplary embodiment.

One goal of the exemplary embodiment is to exploit the functionality provided by ATM technology to reduce equipment and operating costs. The present invention is suitable for any access technology (e.g., AMPS, TDMA, CDMA) although the preferred embodiment uses CDMA because it already uses packetized data.

Figure 1:
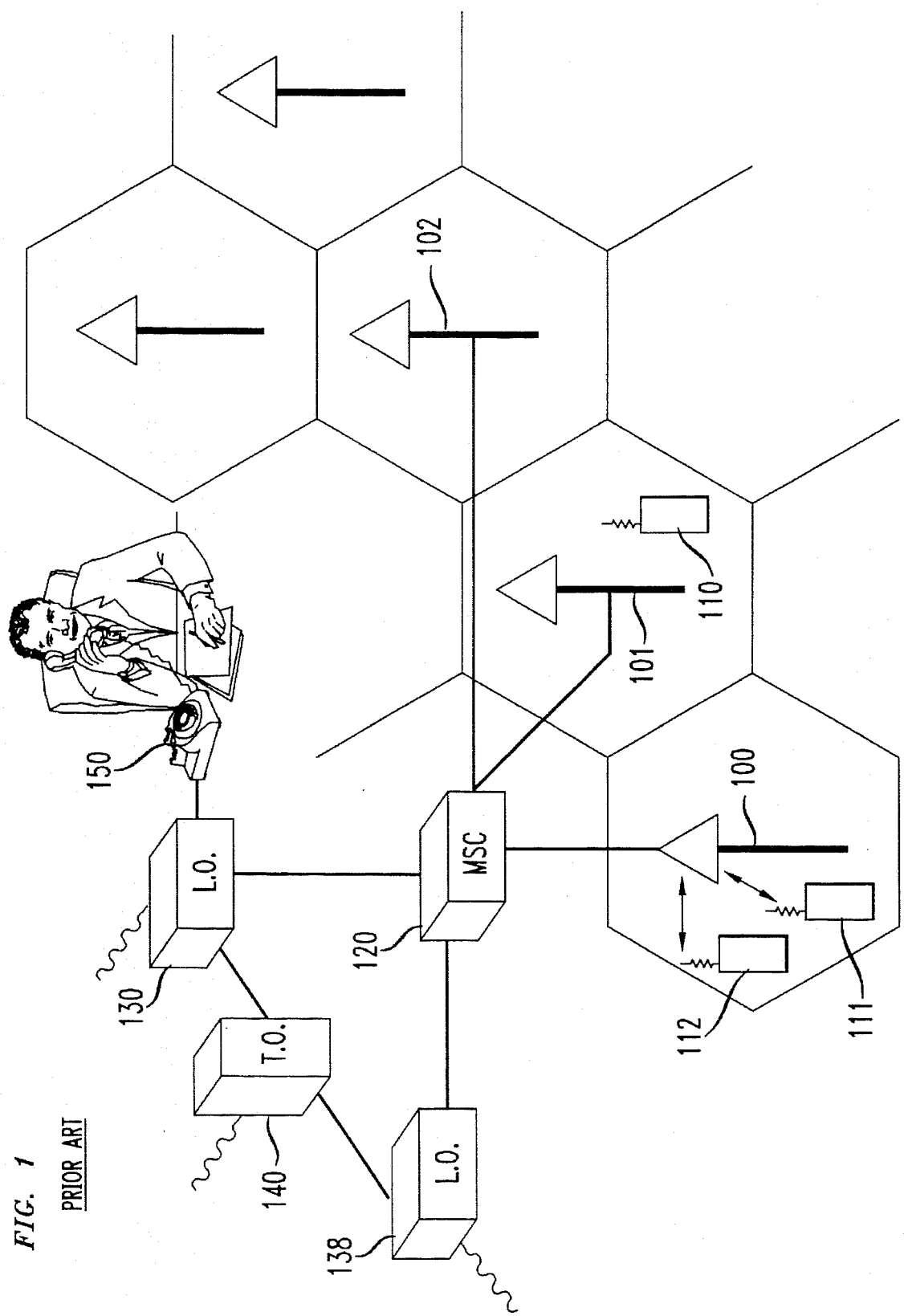
FIG. 1 depicts a schematic diagram of a typical wireless communication system in the prior art.
Figure 2:
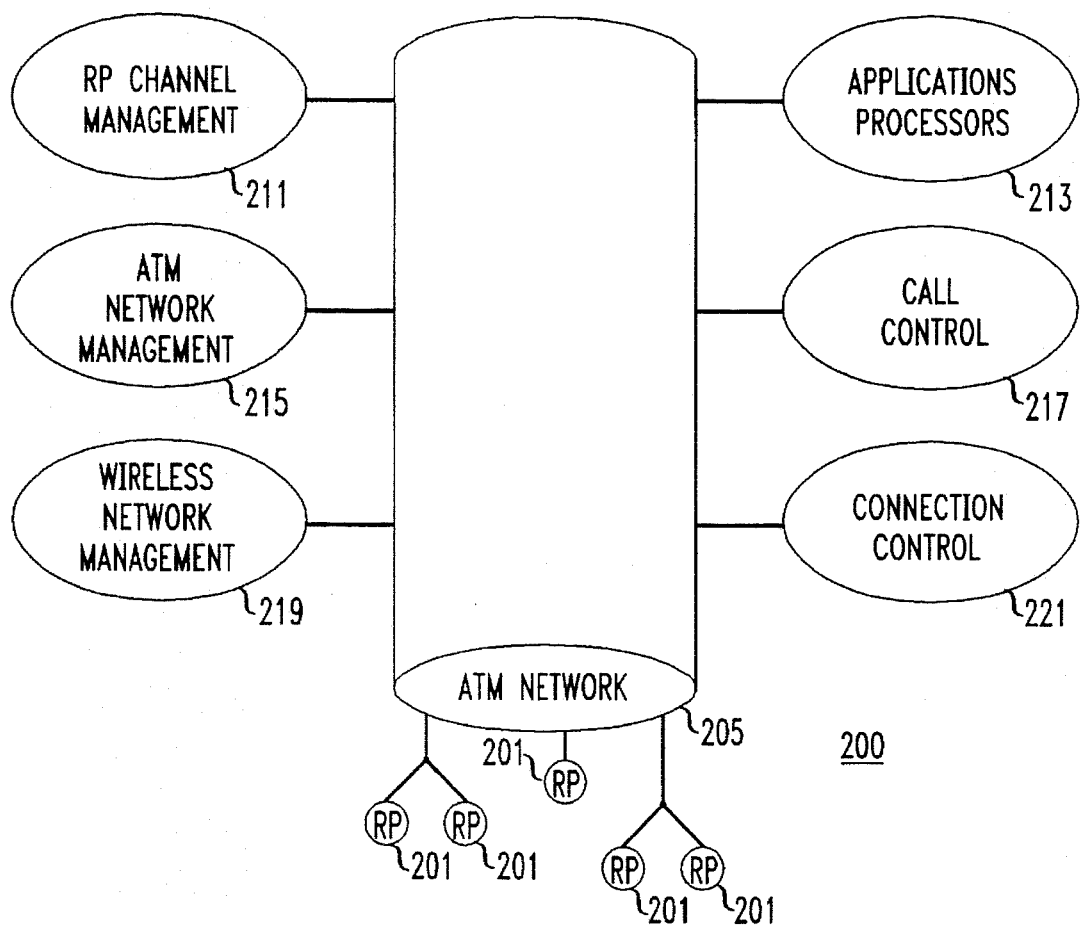
FIG. 2 depicts a schematic diagram of a telecommunications system architecture in accordance with the exemplary embodiment of the present invention.

A high level depiction of the architecture of the exemplary embodiment is given in FIG. 2. Its salient advantages preferably include:

1. the redistribution of the network systems in a modular fashion among a plurality of processing elements or servers (e.g., 211,213, etc.), which are interconnected by a broadband network (e.g., an ATM network, B-ISDN) that uses "cells" to transport information. This approach advantageously facilitates the addition of processing elements to the system, at any time, to accommodate increased demand on the system. It is also advantageous for restoration and failure control.

2. the dynamic allocation of resources. For example, for a given call, only a subset of the processing elements in the system may be required, depending on whether the call is land terminated, wireless terminal terminated, or whether it is a voice, data or multimedia call. In the exemplary embodiment, advantageous connection set-up procedures enable a given call to only consume those resources in the system that are necessary for the completion of the call. 3. extensive exploitation of off-the-shelf components. The broadband network spanning the service area preferably consists of a combination of ATM macro- and micro-switches and ATM multiplexors arranged in a local-area or metropolitan-area network. ATM network components are off-the-shelf units and are already available from several manufacturers. Access to the Public Switched Telephone Network ("PSTN") is provided via ATM Switches and/or stand-alone broadband/narrowband interworking units (shown in FIG. 9).

4. lower system cost. Cell sites ("CS") in the exemplary embodiment are preferably replaced by one or more radio ports ("RP"). Functionally, radio ports are different from cell sites since most of the control functions associated with cell sites are advantageously moved back into the network where they can be accessed/shared by any radio port in the system. This facilitates miniaturization and lowers overall system cost by allowing N+1 sparing of the control function. Fault recovery in current cellular systems is accomplished via 1+1 sparing of the controllers.

5. low cost off-the-shelf ATM multiplexors, which can be used to concentrate traffic from multiple radio ports to benefit from the economy of scale in wide bandwidth pipes. This is one reason why in the exemplary embodiment the ATM transport is preferably extended all the way to the radio ports.

6. the separation of connection management and call management, which enables the accelerated development and introduction of advanced services such as video, imaging, and multimedia. This separation also advantageously facilitates the real-time allocation of network resources (e.g., frame selectors, speech codecs and wireless network controllers).

7. the "user process," which serves as a proxy for the user terminal and which facilitates the set-up of calls involving advanced services (e.g., video). This facilitates call registration without overconsuming costly wireless bandwidth.

8. simplified call-routing and faster call set-up through the use of wireless "fixed points."

9. enhanced services to roaming subscribers through the use of a "Home Call Manager." In contrast to the Home Location Register/Visitor Location Register ("HLR/VLR") approach of systems in the prior art of transferring subscriber profiles between home and serving systems, call control is preferably the responsibility of a subscriber's home service provider regardless of the subscriber's location. Connection management, in contrast, is preferably performed by the serving system. This is facilitated by the availability of high bandwidth pipes to the home system.

10. the simplification of information and resource management through the use of "gateways," which separate the wireless vs. fixed and local vs. global aspects of providing service.

11. the support of expedited mobile-assisted and mobile-directed hand-off through the pre-establishment and dissemination of virtual path connection/virtual circuit connection ("VPC/VCC") routing tables.

12. in-band performance monitoring and supervisory capabilities, which are used for hand-off management, fault management, configuration management, connection quality control and radio link quality control.

The book *ISDN and Broadband ISDN, 2nd Ed*, by William Stallings, Macmillan Publishing Company (1992), provides a good background on ATM technology and ATM adaptation layer protocols and is hereby incorporated by reference as if set forth in its entirety. The disclosure of three United States patent applications, all assigned to the assignee of this application are incorporated by reference: (1) Ser. No. 08/323,958, entitled "Broadband Adaptation Processing," filed Oct. 17, 1994, (2) Ser. No. 08/164,514, entitled "A Signaling System for Broadband Communications Networks," filed Dec. 9, 1993 now U.S. Pat. No. 5,473,679, and (3) Ser. No. 08/164,521, entitled "Direct Signaling System for Narrowband Communications Networks," filed Dec. 9, 1993. Further, the disclosure of D. J. Goodman, U.S. Pat. No. 4,916,691, issued Apr. 10, 1990 is also incorporated by reference.

2. Network Subsystems

The exemplary embodiment preferably comprises conceptual "subsystems" that establish, supervise and release both wireless and wireline calls. Objects that are tightly coupled are grouped into "subsystems." It should be understood that the partitioning of the exemplary embodiment into these conceptual subsystems is only a functional partitioning and in no way should restricts the manner in which embodiments of the present invention can be implemented.

For example, each subsystem can be implemented on its own platform; or several subsystems can share a hardware platform, or one or more subsystems can be distributed across multiple platforms. Except when explicitly stated otherwise, a reference to a particular Management Subsystem or Handler in this specification refers to a logical subsystem rather than the hardware implementation of that subsystem.

2.1 List of Network Subsystems

The exemplary embodiment preferably comprises 25 subsystems, which, for pedagogical reasons, are advantageously divided into six groups according to their primary role. The six groups are:

1. Packet Transport—The subsystems in this group preferably share the responsibility for transporting user information and system data between network elements. The subsystems in this group are:
Radio Port Subsystem ("RP");
Radio Port Multiplexing Subsystem ("RPM");
Packet Handling Subsystem ("PH");
Signaling Message Handling Subsystem ("SMH"); and
Control Channel Message Handling Subsystem ("CCMH").

2. Channel Management—The subsystems in this group are responsible for allocating communications resources (e.g., channels). The subsystems in this group are:
ATM Channel Management Subsystem ("AChM"); and
Radio Port Channel Management Subsystem ("RPChM").

3. Call Control—The subsystems in this group are responsible for processing service requests, and include the following:
Call Management Subsystem ("CM"); and
User Signaling Server Subsystem ("USS").

4. Connection Control and Mobility Management—The subsystems in this group are concerned primarily with connection control and management for mobility. The group includes the following:
Configuration and Location Management Subsystem ("CoLoM");
ATM Connection Management Subsystem ("ACoM");
Radio Channel Quality Management Subsystem ("RCQM"); and
Wireless-Wired Gateway Connection Management Subsystem ("WWGCoM").

5. Network Management—The subsystems in this group are responsible for traditional OA&M processing as well as those aspects of OA&M unique to wireless and ATM applications. The group consists of the following:
Billing Subsystem;
Security Subsystem;
ATM Network Management Subsystem ("ANM"); and
Wireless-Wired Gateway Network Management Subsystem ("WWGNM").

6. Applications and Services—The subsystems in this group are used to support requests for services that require significant amounts of application-specific processing. They include:
Speech Handling Subsystem ("SH");
Multimedia Multiparty Management Subsystem ("MMM");
Packet Data Handling Subsystem ("PDH");
Circuit-Switched Data Handling Subsystem ("CDH");
SS7 Message Handling Subsystem;
Fax Handling Subsystem;
Message Services Subsystem; and
Video Services Subsystem.

2.2 System Operation

This section is intended to illustrate by simple example how the subsystems identified above preferably work together to support typical calls in accordance with the exemplary embodiment.

Figure 3:
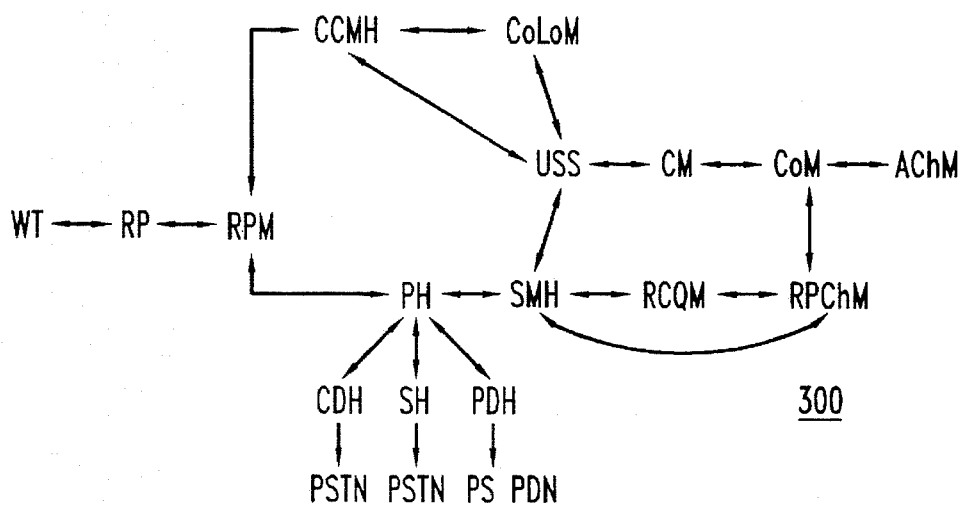
FIG. 3 depicts a diagram of the message flow paths among the logical subsystems that comprise the exemplary embodiment of the present invention.

Referring to FIG. 3, when a packet transmitted by a wireless terminal ("WT") is received by a radio port, it is demodulated, decoded, encapsulated in an ATM cell and forwarded to the Radio Port Multiplexing Subsystem. The Radio Port Multiplexing Subsystem collects ATM cells from several radio ports and multiplexes them onto a higher bandwidth facility for more cost-effective transport to the ATM network.

The ATM network delivers the ATM cells to the Packet Handling Subsystem where, for the first time, the information content of the packet from the wireless terminal is examined. If the packet contains compressed speech data, it is preferably repackaged in an ATM cell and delivered to the Speech Handling Subsystem where the data is decoded and, in general, sent into the PSTN. If the remote end is capable of accepting coded speech, the Speech Handling Subsystem can be bypassed. Similarly, echo cancellation may or may not be included in the path depending on the presence or absence of a 4-wire to 2-wire conversion in the path to the remote terminal.

If the packet delivered to the Packet Handling Subsystem contains circuit mode user data, the contents are encapsulated in an appropriate ATM Adaptation Layer ("AAL") and sent to the Circuit-Switched Data Handling Subsystem that implements the link layer functions and error recovery strategies for the air-interface. Depending on the requirements of the application, the Circuit-Switched Data Handling Subsystem may also terminate the transport layer for the radio interface and begin a new one for the land network, thus performing an internetworking function as well. Packets delivered to the Packet Handling Subsystem containing data for other user services, e.g., packet data or multimedia services, as well as internetworking with B-ISDN are routed to the relevant application data handling subsystem in the same way.

In-band signaling messages, which are typically transmitted in segments over the air-interface, are assembled by the Packet Handling Subsystem before being forwarded to the Signaling Message Handling Subsystem. The Signaling Message Handling Subsystem preferably parses the messages and forwards them to the appropriate control subsystem.

Messages containing radio channel quality measurements are carried in-band on the radio channel and are routed by the radio port, the Packet Handling Subsystem and the Signaling Message Handling Subsystem to the Radio Channel Quality Management Subsystem. When the quality of the radio channel falls below a pre-established level, the Radio Channel Quality Management Subsystem notifies the Radio Port Channel Management Subsystem of the need for a hand-off. Alternatively, in a mobile-directed hand-off, the hand-off request is initiated by the wireless terminal on an access channel and routed by the target radio port to the Control Channel Message Handling Subsystem and directly to the Radio Port Channel Management Subsystem. The Radio Port Channel Management Subsystem is responsible for all aspects of radio resource management, including coordination of the activities needed to effect a successful hand-off.

Call control messages, in contrast, are sent to the User Signaling Server Subsystem. The User Signaling Server Subsystem converts the service-related request into a form compatible with the core call processing platform and forwards it to the Call Management Subsystem. The Call Management Subsystem checks to see whether or not the subscriber is eligible to receive the requested service and enlists the aid of application-specific subsystems as needed to determine the type of connection that is required. Once the connection requirements are advantageously established, the Call Management Subsystem contacts the ATM Connection Management Subsystem and instructs it to establish the appropriate connection. The ATM Connection Management Subsystem determines the optimal route for the connection and, in turn, contacts the ATM Channel Management Subsystem. The ATM Channel Management Subsystems may be distributed across all the network nodes involved in the connection. The ATM Channel Management Subsystem terminates the chain of events by allocating packet transport resources and updating the appropriate virtual path indicator/virtual circuit indicator ("VPI/VCI") translation tables.

Preferably, there is another important function performed by the Packet Handling and Signaling Message Handling Subsystems, namely that of acting as "wireless fixed points." That is, the Packet Handling Subsystem and the Signaling Message Handling Subsystem help make hand-offs transparent to the rest of the network. If the User Signaling Server Subsystem needs to contact a wireless terminal, for example, it simply sends the data it wants delivered to the wireless terminal to the Signaling Message Handling Subsystem. The Signaling Message Handling Subsystem constructs the appropriate message and forwards it to the Packet Handling Subsystem, where it is merged with the user data stream and sent to the radio port (or multiple Radio ports during soft hand-offs) with which the wireless terminal is communicating. If the Signaling Message Handling Subsystem and Packet Handling Subsystem did not perform the wireless fixed-point function, each control subsystem would have to track the whereabouts of every wireless terminal it serves down to the serving radio port level.

Messages received by a radio port on the reverse control channel (access channel) are routed directly to the Control Channel Message Handling Subsystem over PVCs. The Control Channel Message Handling Subsystem and Signaling Message Handling Subsystem are similar in many respects. Both, for example, implement a discrimination function for parsing out messages to the control subsystems. Both also play key roles in relaying information from the system to the wireless terminal. One Signaling Message Handling Subsystem resource is preferably dedicated per active wireless terminal during a call; one Control Channel Message Handling Subsystem resource is preferably dedicated permanently per radio port.

The Control Channel Message Handling Subsystem routes power-up registration information to the Configuration and Location Management Subsystem. The Configuration and Location Management Subsystem, being responsible for subsystem resource assignment, uses this information to instantiate a User Process ("UP") in the aforementioned User Signaling Server Subsystem and to allocate Wireless-Wired Gateway Connection Management Subsystem resources. The Wireless-Wired Gateway Connection Management Subsystem oversees the per-call establishment of connections between the wireless fixed point (i.e., the Packet Handling Subsystem and Signaling Message Handling Subsystem) and the radio port.

The Control Channel Message Handling Subsystem forwards subsequent registration attempts directly to the appropriate User Process, consulting the Configuration and Location Management Subsystem only when it receives a message from a wireless terminal it knows nothing about. This is advantageously done to keep the Configuration and Location Management Subsystem from becoming a bottleneck due to numerous location updates.

The Control Channel Message Handling Subsystem also routes requests for service directly to the User Process. The User Signaling Server Subsystem housing the User Process processes such requests in essentially the same manner as those routed to it via the Signaling Message Handling Subsystem.

Two of the subsystems not shown in FIG. 3 are the ATM Network Management Subsystem and the Wireless-Wired Gateway Network Management Subsystem. The ATM Network Management Subsystem is responsible for the maintenance and configuration functions normally associated with ATM networks, including populating the ATM Connection Management Subsystem routing tables. The Wireless-Wired Gateway Network Management Subsystem, in contrast, is responsible for establishing the signaling links between subsystems unique to the wireless application (e.g., radio port, Packet Handling Subsystem and Control Channel Message Handling Subsystem). The Wireless-Wired Gateway Network Management Subsystem is also responsible for pre-establishing the matched virtual circuit identifier ("VCID") sets used for facilitating rapid hand-offs. This process is described more fully in Section V below.

The roles played by the other subsystems identified in Section 2.1 but not depicted in FIG. 3 are described in Section 2.1.3 along with a more detailed description of the subsystems previously discussed.

2.3 Subsystem Descriptions 2.3.1 The Packet Transport Group of Subsystems 2.3.1.1 Radio Port Subsystem The Radio Port Subsystem preferably provides the physical transport related functions associated with the air-interface, including frequency translation and modulation/demodulation. Moreover, since soft-decision decoding is more conveniently implemented where the physical layer of the radio interface is terminated, channel coding/decoding and interleaving/deinterleaving are also advantageously regarded as Radio Port Subsystem functions. Furthermore, depending on the air-interface, multiple channel decoders may advantageously be implemented to support variable rate coding strategies and/or to distinguish packets containing user data from those carrying blank and burst signaling.

In addition to terminating the air-interface physical layer, the Radio Port Subsystem also terminates the B-ISDN physical layer, the ATM and AAL layers for at least four pre-established VPCs and their associated VCCs. One VP/VC is used to transport decoded traffic channel packets between the radio port and Packet Handling Subsystem. The VCCs associated with this VPC are allocated on a per-call basis by the Radio Port Channel Management Subsystem in response to a request for a connection from the Wireless-Wired Gateway Connection Management Subsystem. Depending on the hand-off mechanism in effect, more than one VP/VC may be assigned to a given call by the Radio Port Channel Management Subsystem. A second VPC is used to support the pilot, paging and access channel processes running in the Control Channel Message Handling Subsystem. The third VPC is used to access the radio resource allocation and ATM channel management functions provided by the Radio Port Channel Management Subsystem. The fourth is used by the Radio Channel Quality Management Subsystem to download dynamic power control instructions.

For cellular coverage the Radio Port Subsystem is preferably distributed across multiple hardware "boxes," or "radio ports." Each radio port provides radio coverage for a specific geographic area. The number and placement of Radio ports is dependent on several factors, including topography, multiple access technology, capacity, frequency band, zoning rules and the availability and cost of network access. Furthermore, some radio ports can only support a few users (e.g., picocells), while other radio ports can support hundreds of users (e.g., macrocells). Regardless of their size or number or the access technology they support, the primary function of the individual radio port remains the same as in the prior art: to convert electromagnetic signals to bits, and vice-versa.

2.3.1.2 Radio Port Multiplexing Subsystem

The preferred function of the Radio Port Multiplexing Subsystem is to concentrate the traffic from multiple radio ports to achieve the economy of scale normally attained from transport via higher bandwidth facilities. Note that the Radio Port Multiplexing Subsystem preferably does not perform any control functions. In fact, the Radio Port Multiplexing Subsystem does not even terminate AALs. As such, the Radio Port Multiplexing Subsystem is not the same as, nor should it be compared to or confused with, the radio port controller elements of other architectures (e.g., GSM and PACS). All control functions normally associated with radio port controllers are advantageously moved back into the network where they can be accessed by all the radio ports in the system, not just by the radio ports connected to a controller via dedicated, nailed-up links. The separation of the control and multiplexing functions also enables the use of industry-standard ATM multiplexors as a platform for the Radio Port Multiplexing Subsystem.

2.3.1.3 Packet Handling Subsystem

The Packet Handling subsystem terminates network-radio port VCCs and their associated AALs. Depending upon the requirements of the air-interface, it may also terminate the traffic channel link layer and/or implement a frame-selection function to support soft hand-offs. Regardless of the air-interface, however, the Packet Handling Subsystem is always responsible for separating speech, user-data and in-band signaling into separate streams, and for directing each stream to the appropriate subsystem for further processing (or concatenating separate streams for transmission to the wireless terminal).

In the reverse direction, the Packet Handling Subsystem directs speech packets from the Radio Port Subsystem to the Speech Handling Subsystem and user-data packets to the appropriate data handling subsystem. In-band signaling messages are forwarded to the Signaling Message Handling Subsystem once they are advantageously assembled. In the forward direction, the Packet Handling Subsystem combines signaling data from the Signaling Message Handling Subsystem with speech data from the Speech Handling Subsystem, in accordance with the rules of the associated air-interface. It then encapsulates the results in an AAL and sends the ATM cells to the radio port serving the wireless terminal over the appropriate VP/VC (multiple VPs/VCs in the case of soft hand-off).

As noted previously in Section 2.2, the Packet Handling Subsystem also serves as the fixed-point for the call. That is, while it may be necessary to change the VPs/VCs between the Packet Handling Subsystem and Radio Port Subsystem during a call to maintain the radio link, the VPCs/VCCs between the Packet Handling Subsystem and the other subsystems it communicates with only change during a call in response to component failures or requests for hard-hand-offs to other systems.

2.3.1.4 Signaling Message Handler Subsystem

The Signaling Message Handling Subsystem performs two basic functions:
parsing out reverse traffic channel signaling messages to the appropriate control subsystem; and
acting as the signaling fixed-point for the transmission of messages to wireless terminals on forward traffic channels.

Figure 4:
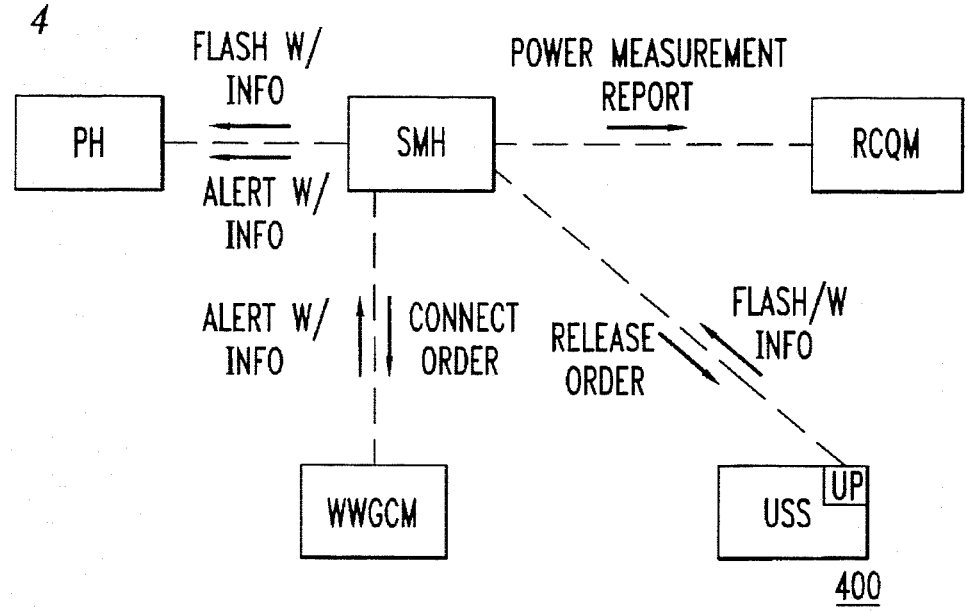
FIG. 4 depicts a schematic diagram of typical message flows involving some of the logical subsystems that comprise the exemplary embodiment.

The Signaling Message Handling Subsystem preferably communicates with the Wireless-Wired Gateway Connection Management Subsystem, the User Signaling Server Subsystem, the Radio Channel Quality Management Subsystem and the Packet Handling Subsystem. As depicted in FIG. 4, this is preferably done over pre-provisioned VP/VCs when the subsystems are not co-located.

The parsing and fixed-point functions of the Signaling Message Handling Subsystem are also illustrated in FIG. 4. For example, the Signaling Message Handling Subsystem forwards:

"Connect Order Messages" indicating acceptance of incoming calls to the Wireless-Wired Gateway Connection Management Subsystem, "Power Measurement Report Messages" containing wireless terminal assisted hand-off data to the Radio Channel Quality Management Subsystem, and "Release Order Messages" ending calls to the User Signaling Server Subsystem.

Messages passed on by the Signaling Message Handling Subsystem to the Packet Handling Subsystem as part of the Signaling Message Handling Subsystem's fixed-point role include:

"Alert With Information Messages" from the Wireless-Wired Gateway Connection Management Subsystem indicating the presence of incoming calls, and "Flash with Information Messages" from the User Signaling Server Subsystem system supporting the call-waiting feature.

Note that the above lists are by no means exhaustive and may vary considerably from one air-interface to another. However, for a given "suite" of air-interfaces, e.g., AMPS, the set of forward and reverse traffic channel messages and their content tend to be similar. As such, the Signaling Message Handling Subsystems for the members of the suite are be remarkably similar, even though corresponding messages may be formatted (and named) quite differently.

2.3.1.5 Control Channel Message Handler Subsystem

The Control Channel Message Handling Subsystem performs three functions:
Paging Channel Processing ("PCP");
Access Channel Processing ("ACP"); and
Pilot and Sync Channel Processing ("PSP").

The Control Channel Message Handling Subsystem and Radio Port Subsystem communicate directly over pre-established VPs/VCs. The Packet Handling Subsystem is preferably not in the path because two of its main functions, e.g., frame selection and user data vs. signaling discrimination, are not needed to process control channel message streams.

In addition to Page messages, the Paging Channel Processing function also handles System Parameter, Access Parameter, Neighbor List, and CDMA Channel List messages. These messages are transmitted periodically by the radio port on the paging channel. For information on CDMA technology and the internal formatting of CDMA packets, the reader is referred to Interim Standard 95 (alternatively known as PN-3118 and "IS-95"), which published by the Telecommunications Industry Association, Washington D.C., and is hereby incorporated by reference as if set forth in its entirety.

Of particular interest here, because of its impact on the registration scenarios, is the System Parameter message. Among other things, the System Parameter message is used to inform the wireless terminals under what circumstances they need to register. There are flags to indicate, for example, whether or not the wireless terminals need to register upon power-up and/or power-down, when they cross from one "zone" in the system to another, or periodically when a registration timer expires. In other words, with all of these registration options preferably available, there is no need to support procedures in the network for offering calls to unregistered wireless terminals. As such, no provisions are advantageously made, for example, to support scenarios in which an Origination message is the first indication that the wireless terminal in question is active in the system.

The primary duty of Access Channel Processing is to route messages arriving via reverse control channels to the appropriate subsystem for further processing. Upon receipt of a Registration message, for example, Access Channel Processing checks to see if it knows how to deliver it to the User Process representing the wireless terminal. If it doesn't, it passes the message on to the Configuration and Location Management Subsystem which, in turn, instantiate a User Process in the User Signaling Server Subsystem and tells the Control Channel Message Handling Subsystem how to communicate with it. Establishing the Control Channel Message Handling Subsystem to User Process communications link during the registration process allows the Control Channel Message Handling Subsystem to forward subsequent registration messages, as well as requests for service (i.e., Origination messages) directly to the User Process. This speeds-up the call establishment process and reduces the load on the Configuration and Location Management Subsystem. Communications between the Control Channel Message Handling Subsystem and the Configuration and Location Management Subsystem and User Signaling Server Subsystems are carried over pre-established VPs/VCs.

It should be noted that alternative schemes wherein all Registration and Origination messages are forwarded to the Configuration and Location Management Subsystem for subsequent delivery to the User Process can also be implemented. The advantage of embodiments incorporating this scheme is that it eliminates the need for the Control Channel Message Handling Subsystem to maintain Control Channel Message Handling Subsystem-User Signaling Server Subsystem routing tables.

If the system supports short message services, the Control Channel Message Handling Subsystem also maintains communications links to the Message Services subsystem.

2.3.2 The Channel Management Group of Subsystems
2.3.2.1 ATM Channel Management Subsystem The ATM Channel Management Subsystem preferably manages "channel" and VP/VC translation tables. A channel means a point-to-point unidirectional link within an ATM interface between a user/server and a switch, between two switches, between a switch and a cross-connect, or between cross-connects. It corresponds to the virtual channel link ("VCL") or virtual path link ("VPL") as defined in CCITT Recommendation I.113. The VP/VC Translation Table lists the interconnections of channels that support connections passing through switches or cross-connects. The functions of the channel manager preferably are:

reserve, allocate, modify, drop, and maintain channels on all the ports of the switch or end-point (user or server) with which this channel manager is associated;
maintain VP/VC Translation Table entries for connections that traverse the switch with which the channel manager is associated; and
provide hand-off control by reassigning channels and VP/VC translation table entries as needed while a wireless terminal moves.

The ATM Channel Management Subsystem is preferably distributed across all the network elements, one instance of the subsystem is implemented per network element. Functionally, these channel managers are used to handle channels that are needed both for switched connections on a per call basis, as well as channels used in provisioned connections, which, for example, are needed to support fast hand-off procedures. It should be noted that ATM Channel Management Subsystems manage channel identification allocation (VP/VC allocation) and resource verification over single links only. They do not have a global view of the network and are preferably not involved in selecting routes.

2.2.2 Radio Port Channel Management Subsystem

The Radio Port Channel Management Subsystem is responsible for:
RF channel management; and
Radio Port Subsystem ATM channel management.

In its role as RF channel manager, the Radio Port Channel Management Subsystem preferably selects the channel, subchannel, timing offset, etc., that is used to handle each call. The data needed by the Radio Port Subsystem to establish and maintain radio links is delivered directly via pre-established VP/VC. Wireless terminal station parameters, in contrast, are sent to the Control Channel Message Handling Subsystem. There, the Paging Channel Processing function constructs a Channel Assignment message and sends it to the serving radio port for subsequent transmission to the wireless terminal.

The Radio Port Channel Management Subsystem RF channel management function is also responsible for supervising hand-offs. This involves:

identifying target radio ports based on data supplied by the Radio Channel Quality Management Subsystem,
executing the appropriate call processing algorithm, and
working with the ATM Channel Management Subsystem to modify VP/VC translation table entries to reflect the fact that the connection has been altered.

The latter function is actually part of the other role played by the Radio Port Channel Management Subsystem, i.e., that of ATM channel manager for the radio ports. In this capacity the Radio Port Channel Management Subsystem is also responsible for populating and updating the tables mapping VP/VCs to radio port channels and subchannels, as well as performing the functions identified in the previous section.

2.3.3 The Call Control Group of Subsystems
2.3.3.1 Call Management Subsystem

The Call Management Subsystem processes "calls," which are defined as associations between user applications and servers. Its specific functions include:

providing the capability to establish, modify and release calls,
maintaining subscriber profiles,
facilitating user-to-user and user-to-network negotiation of options and check for user/server status and compatibility,
providing service invocation and coordination functions,
recognizing any need for special resources, such as protocol converters,
maintaining call state and configuration information, and
managing call reference values and user account information for select services.

The Multimedia Multiparty Management Subsystem, Configuration and Location Management Subsystem and ATM Connection Management Subsystem entities are among the other subsystems in the architecture of the exemplary embodiment supported by the Call Management Subsystem.

2.3.3.2 User Signaling Server Subsystem

The User Signaling Server Subsystem manages the lifecycle of User Processes ("UPs"). Each User Process acts as an agent for the call control needs of a single wireless terminal. That is, network call processing entities communicate with the User Process representing the wireless terminal indirectly, rather than the wireless terminal itself. User Processes are instantiate by the Configuration and Location Management Subsystem when the wireless terminal powers-up or otherwise first registers in the system. In addition to handling Registration messages, User Processes preferably:

tracks the availability and willingness of the wireless terminal to accept incoming calls, processes Origination messages, representing wireless terminals in negotiations with the network for requests for service, and responds to requests from the Wireless-Wired Gateway Connection Management Subsystem to find the radio port serving a particular wireless terminal.

For example, by tracking the busy/idle status of the wireless terminal and knowing which way "MOB_TERM," a parameter in Registration messages, has been set, the User Process is able to limit paging to those wireless terminals that are available and willing to accept incoming calls.

In connection with the second item, note that in the event the wireless terminal has extended capabilities, e.g., it is a multimedia laptop, it may be necessary for the User Process to communicate with the wireless terminal to obtain the information it needs to adequately represent the wireless terminal in negotiations with the network. By using the User Process as an agent for the wireless terminal, this transfer, of often substantial quantities of data, takes place during the registration process instead of during the call establishment process. This expedites call set-up. Furthermore, the interworking function provided by the User Process encourages the use of simpler terminal equipment and makes it possible for the network to support a wider variety of terminal designs.

In its role as the subsystem responsible for finding the radio port able to communicate with the wireless terminal, the User Signaling Server Subsystem constructs a Page message and sends it to the Control Channel Message Handling Subsystem(s) serving the area (i.e., zones) where the wireless terminal last registered. The Paging Channel Processing within each Control Channel Message Handling Subsystem contacted in turn ensures that the Page message is delivered to each radio port from which the page is to be broadcasted. The identity of the radio port and Control Channel Message Handling Subsystem that receives the Page Response message from the wireless terminal is stored in the User Process and also sent to the subsystem issuing the "FIND" request. Subsequent communication with the wireless terminal need not involve the User Process. That is, communication between the wireless terminal and the network can be carried out directly via the radio port, Paging Channel Processing and Access Channel Processing serving the wireless terminal once their identity has been determined.

2.3.4 The Connection Control and Mobility Management Group of Subsystems 2.3.4.1 Configuration and Location Management Subsystem The Configuration and Location Management Subsystem preferably performs several functions.

First, it receives registration messages (simpler versions of the air interface Registration message) from the Access Channel Processing in the Control Channel Message Handling Subsystem serving the wireless terminal. If it is a power-up registration, the Configuration and Location Management Subsystem sends a message to the User Signaling Server Subsystem instructing it to initiate a User Process for the wireless terminal. In addition to the identity of the wireless terminal, the message also contains the list of Control Channel Message Handling Subsystems serving the radio ports with which the wireless terminal is most likely to be able to communicate.

To avoid the need to have all messages received by the Control Channel Message Handling Subsystem passed on to the Configuration and Location Management Subsystem for routing, the Configuration and Location Management Subsystem sends each of the Access Channel Processes associated with one of the Control Channel Message Handling Subsystems on the list instructions as to how to contact the User Process directly.

If it is a power-down registration, the Configuration and Location Management Subsystem sends a message to the User Signaling Server Subsystem instructing it to delete the User Process. If the message from the Access Channel Process indicates the registration is zone-based, the Configuration and Location Management Subsystem first determines whether or not it is necessary to migrate the User Process to a different User Signaling Server Subsystem. This may be necessary, for example, if there are no direct signaling links (VP/VCs) between the Control Channel Message Handling Subsystem housing the Paging Channel Processing and Access Channel Processing in communication with the wireless terminal and the "old" User Signaling Server Subsystem. If it is necessary to migrate the User Process, the Configuration and Location Management Subsystem oversees both the creation of the new User Process and the destruction of the old one.

If the User Process does not have to be moved, the Configuration and Location Management Subsystem sends the User Process an updated list of Control Channel Message Handling Subsystem addresses corresponding to the new area where the wireless terminal needs to be paged. In this case the Configuration and Location Management Subsystem must also inform the Access Channel Processes associated with the new Control Channel Message Handling Subsystems on the list how to contact the User Process. This latter step reduces the load on the Configuration and Location Management Subsystem by allowing subsequent Registration messages to be routed directly to the User Process. By allowing Origination messages to be routed directly to the User Process as well, the last step also serves to reduce post-dial delay.

Second, the Configuration and Location Management Subsystem assigns Call Management Subsystem, ATM Connection Management Subsystem and Wireless-Wired Gateway Connection Management Subsystem resources to handle a given wireless terminal. Some resources, e.g., Call Management Subsystem resources, are assigned when a wireless terminal first enters service. Other resources are assigned during the registration process. ATM Connection Management Subsystem and Wireless-Wired Gateway Connection Management Subsystem (as well as Control Channel Message Handling Subsystem and User Signaling Server Subsystem) resources fit into this group. In any case, depending on where the call arrives (i.e., which network service provider Point-of-Presence ("POP")) and where it needs to be routed to (e.g., which radio port), some of resources may need to be re-allocated in real-time during call establishment. This is also done under the control of the Configuration and Location Management Subsystem.

Third, the Configuration and Location Management Subsystem fields requests from other subsystems as to how to address resources assigned to a given wireless terminal.

Fourth, the Configuration and Location Management Subsystem generates Setup Segment messages to the ATM Connection Management Subsystem to provision VP/VCs between different network entities.

Fifth, the Configuration and Location Management Subsystem generates Setup Connections messages to establish VP/VCs for transporting signaling messages between network entities. Signaling AALs ("S-AALs") are typically used on these connections. As is normally the case, signaling-AALs are terminated at the connection end-points. If the connection is a VPC, then the VCI field in the ATM cells is ignored. An additional Connection-Less Protocol ("CLP") may be used above the signaling-AAL to allow for datagram routing of signaling messages between network entities that do not have a direct signaling VP/VC.

2.3.4.2 ATM Connection Management Subsystem

The ATM Connection Manager Subsystem manages Connections, Call-Connection Mappings, Routes, and Segments. A Connection is defined to be a communication path that interconnects multiple users/servers through switches. It extends between entities where the ATM Adaptation Layer ("AAL") is terminated. That is, connections terminate on servers and/or user equipment, and not on the switches and multiplexors. The Call-Connection Mapping function manages the many-to-many relationship between the calls and connections. It indicates the identities of all the connections that are managed within the context of a given call.

A Route is a path that passes through one or more users/servers and through one or more switches. It captures the connection-to-connection relationship where multiple connections may be routed on the same or divergent paths.

A Segment is a concatenation of one or more channels. It may be part of a connection. In CCITT Recommendation I.610, a "VPC Segment" is defined as a concatenation of VP links that belong to a common administrative domain, and a "VCC Segment" is defined as a concatenation of VC links that belong to a common administrative domain. Our definition of the word Segment is more general, in that it is simply a concatenation of a set of VP or VC links. Thus, both VCS ("Virtual Channel Segment") and VPS ("Virtual Path Segment") are possible. In most cases, such segments will belong to the same administrative domain, but this is not mandated in our definition. The important difference between operations on connections and segments is that the former involves interacting with the AAL at the termination points of the connection, while the latter does not involve any AAL termination points.

Thus, the collective functions of the connection manager preferably comprise:

providing the capabilities to add/drop/modify a connection, where modifying a connection includes adding a participant, dropping a participant, or changing the quality of service of an existing connection;

providing common/diverse routing of connections and end-to-end quality of service computation for connections;

handling multiple connections in a call;

setting up and tearing down segments of a connection; and determining the need for multiple connections in order to support the connection requested based on analysis of user addresses (digit analysis) or the analysis of other parameters (e.g. bi-directional multicast that requires mixing of signals).

As an example of the last function, the ATM Connection Management Subsystem is responsible for analyzing the calling and called party numbers (or initiating other dialog with the Call Managers) to determine whether or not the Speech Handling Subsystem needs to be involved in the call to convert compressed air-interface speech data to a form compatible with the network and vice-versa. If the Speech Handling Subsystem needs to be involved and, as is advantageously the case, the Speech Handling Subsystem is not co-located with the Packet Handling Subsystem, multiple AAL terminations are needed. This in turn, implies that multiple connections (VP/VCs) need to be established to fulfill the single connection setup request sent to the ATM Connection Management Subsystem by the Call Management Subsystem. The use of provisioned VP Segments between the Packet Handling Subsystem and Speech Handling Subsystems simplifies the ATM Connection Management Subsystem's task considerably by reducing the task to one of only communicating with the Channel Managers for the two VP Segments end-points to select a VC within this VP Segment to handle the call.

Figure 5:
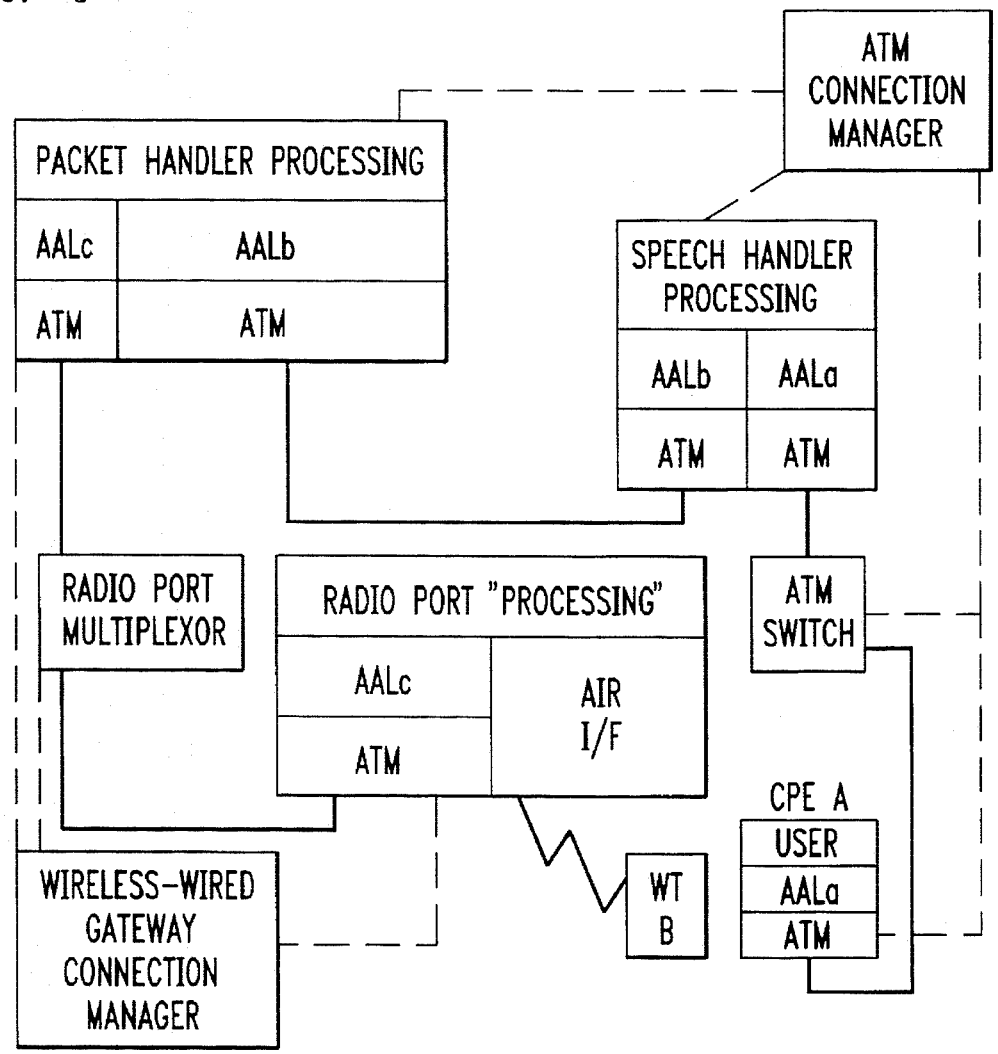
FIG. 5 depicts a diagram of typical signaling connections in the exemplary embodiment.

The above example is illustrated in FIG. 5, where CPE A, capable of handling 64 kb/s PCM voice, requests a connection to wireless terminal B, which has an interface for 9.6 kb/s voice. This user request is realized with three connections. The first one extends between CPE A and the processor supporting the Speech Handling Subsystem function (identified by AAL a terminations). The second connection extends between the Speech Handling Subsystem and the Packet Handling Subsystem (identified by AAL b terminations). Note that the VP Segment is extended between the AAL termination points for this connection. This limits the number of points with which the connection manager needs to interact with to the two VP Segment end-points, i.e., the Packet Handling Subsystem and Speech Handling Subsystem.

The two signaling connections are shown with dashed lines in FIG. 5. A few virtual path segments are provisioned in advance, for this purpose. At the time of a call connection request, only a VCI identifying a virtual channel link is selected on any one of these virtual path segments. The third connection extends between the Packet Handling Subsystem and the radio port (identified by AAL c terminations). Again, one VC per wireless terminal connection (in each direction) is allocated per connection on the provisioned VPSs between these two points. The radio port maps packets from this to the specific forward traffic channel assigned to the wireless terminal and vice versa.

A special connection manager, the Wireless-Wired Gateway Connection Management Subsystem, is assigned to handle connections from the Packet Handling Subsystem out to the wireless terminal.

2.3.4.3 Radio Channel Quality Management Subsystem

The Radio Channel Quality Management Subsystem preferably processes wireless terminal assisted hand-off data forwarded to it by the Signaling Message Handling Subsystem. When the data suggests the need for a hand-off, the Radio Channel Quality Management Subsystem commences the hand-off process by contacting the Radio Port Channel Management Subsystem via a pre-established VP/VC. The Radio Channel Quality Management Subsystem also implements forward and reverse power control algorithms, downloading updated power levels to the radio port over pre-established, dedicated VP/VCs.

2.3.4.4 Wireless-Wired Gateway Connection Management Subsystem

The Wireless-Wired Gateway Connection Management Subsystem is preferably responsible for setting-up and tearing-down connections from the Packet Handling Subsystem out to the wireless terminal. More specifically (referring again to FIG. 5), the Wireless-Wired Gateway Connection Management Subsystem manages connections between radio ports and Radio Port Multiplexing and between Radio Port Multiplexing and Packet Handling Subsystem.

One instance of the Wireless-Wired Gateway Connection Management Subsystem is associated with each instance of the Packet Handling Subsystem. The Wireless-Wired Gateway Connection Management Subsystem interfaces with the Radio Port Channel Management Subsystem and ATM Channel Management Subsystems to reserve and commit channels and to setup VP/VC translation table entries in the units they support. It also communicates with the User Signaling Server Subsystem to identify the radio port able to communicate with the wireless terminal. Once the Wireless-Wired Gateway Connection Management Subsystem knows the identity of the radio port able to serve the wireless terminal and the location of the Packet Handling Subsystem assigned by the ATM Connection Management Subsystem to handle the call, it sends a Reserve-channel or Commit-channel message, as appropriate, to the Radio Port Channel Management Subsystem to reserve or commit air-interface traffic channel resources and the VP/VCs between the radio port and the Packet Handling Subsystem. Note that it is preferred that the VC/VCs are provisioned between the Packet Handling Subsystem and Radio Port Subsystem, and that during connection setup only a VCI on any of these provisioned VPSs needs to be picked in each direction.

2.3.5 Network Management Group of Subsystems 2.3.5.1 The Billing Subsystem

The Billing Subsystem preferably collects data from other subsystems (e.g., Call Management Subsystem and Multimedia Multiparty Management Subsystem) to track service usage for accounting purposes.

2.3.5.2 Security Subsystem

The duties of the Security Subsystem preferably include:
processing authentication-related information (e.g., AUTHR) appended to Registration and Origination messages,
computing signaling message encryption keys, and
generating privacy masks (if applicable).

2.3.5.3 ATM Network Management Subsystem

The ATM Network Management Subsystem helps operate and maintain the backbone portion of the network. This includes instances of the Speech Handling Subsystem, the Call Management Subsystem, the ATM Connection Management Subsystem, the Configuration and Location Management Subsystem and the Channel Management Subsystem. The ATM Network Management Subsystem is not responsible for maintaining subsystems unique to wireless access. The ATM Network Management Subsystem does not support, for example, the Radio Port or the Radio Port Channel Management Subsystem. As described in the next section, "wireless" domains are instead supported by the Wireless-Wired Gateway Network Management Subsystem.

The ATM Network Management Subsystem performs performance monitoring, fault management and configuration management. It keeps track of changes in network topology. The ATM Network Management Subsystem determines the number and attributes of VP/VCs between Network Elements. It also computes the routing tables used by the ATM Connection Management Subsystem to establish VP/VCs between network elements. In generating these tables the attributes of the connection as well as its endpoints are considered. The attributes include bandwidth, priority class, AAL type for VCCs to be carried within a VPS and explicit routing information (e.g., intermediate nodes). The ATM Connection Management Subsystem in turn uses this information to initialize translation tables at cross-connects and ATM switches to provision the VP/VCs. The ATM Network Management Subsystem will also be responsible for computing and downloading routing tables to the ATM Connection Management Subsystem for use in establishing switched VP/VCs if and when the need for these types of connections arises.

The data supporting ATM Network Management Subsystem fault and configuration management functions is derived from OA&M channel performance measurements. When necessary, the ATM Network Management Subsystem and Wireless-Wired Gateway Network Management Subsystems coordinate their activities via messages exchanged over pre-established VPCs. Communication of this sort is required, for example, to establish the VPSs used to support new radio ports.

2.3.5.4 Wireless-Wired Gateway Network Management Subsystem

The Wireless-Wired Gateway Network Management Subsystem is preferably responsible for maintaining the portion of the network directly supporting the wireless terminal environment. More specifically, it looks after the OA&M needs of the Radio Port Subsystem, the Radio Port Multiplexing, the Packet Handling Subsystem, the Signaling Message Handling Subsystem, the Control Channel Message Handling Subsystem, the Radio Port Channel Management Subsystem and the Wireless-Wired Gateway Connection Management Subsystem. Its duties preferably include performance monitoring, fault management and routing table computation and updating.

The latter function, routing table computation and updating, is invoked whenever a component is added or removed from the network. When a radio port is added to the system, for example, it is the Wireless-Wired Gateway Network Management Subsystem that assumes the responsibility for creating the VPCs, VPSs, VCCs and VCSs used by the radio port to communicate with other network elements. This involves computing the optimal route for each connection and sending provisioning messages to the Wireless-Wired Gateway Connection Management Subsystem identifying the number of circuits to be added, their endpoints and attributes. The attributes include bandwidth, priority treatment and, if needed, information on any intermediate nodes. If fast-hand-off procedures are to be supported, the Wireless-Wired Gateway Network Management Subsystem must also coordinate the assignment of VP/VC identifiers for fast hand-off.

In addition to establishing the VPC/VCCs used to transport user data, the Wireless-Wired Gateway Network Management Subsystem is also responsible for provisioning the dedicated VP/VCs used to carry access channel messages to the Control Channel Message Handling Subsystem, radio channel assignment data to radio ports, etc.

2.3.6 The Applications and Services Group of Subsystems 2.3.6.1 Speech Handling Subsystem The Speech Handling Subsystem provides speech transcoding between the compressed speech used over the air-interface and PCM used in the PSTN. Echo cancellation may also be implemented here.

2.3.6.2 Multimedia Multiparty Management Subsystem

The Multimedia Multiparty Management Subsystem provides service-specific processing to handle multimedia multiparty calls between user end points. It handles negotiations with user end-points to determine their specific characteristics. It then requests connections with bandwidth and Quality of Service attributes needed to meet the requirements of the service. Requests for connections are conveyed to the ATM Connection Management Subsystem via the Call Management Subsystem. This allows the Call Management Subsystem to perform additional feature management (if required) before requesting connections from the ATM Connection Management Subsystem. The Multimedia Multiparty Management Subsystem also interacts with the Billing subsystem to track service usage for accounting purposes.

2.6.3 Packet Data Handling Subsystem

The Packet Data Handling Subsystem terminates the AAL used at the Packet Handling Subsystem to support packet data. It also implements the link layer and/or transport layer recovery procedures for packets transmitted and received over the air-interface and supports interworking with the public packet data network.

2.3.6.4 Circuit-Switched Data Handling Subsystem

The Circuit-Switched Data Handling Subsystem preferably implements link layer functions and recovery strategies for the air-interface. If needed, it also terminates the transport layer for the air-interface and initiate a new one for the land network.

2.3.6.5 SS7 Message Handling Subsystem

The SS7 Message Handling Subsystem preferably terminates the Message Transfer Part and Signaling Connection Control Part portions of the SS7 protocol stack. Higher layer protocols are terminated elsewhere in the system. The ISDN User Part and the IS-41 Mobile Application Part protocols, for example, are terminated by functions in the Call Management Subsystem.

2.3.6.6 Fax Handling Subsystem

The Fax Handling Subsystem functions in essentially the same way as the Packet and Circuit-Switched Data Handling subsystems. That is, it terminates air-interface link layer functions, supports the re-establishment of failed links and provides any interworking with the land network needed to establish and maintain the end-to-end transfer of data.

2.3.6.7 Message Services Subsystem

This Subsystem is responsible for any service-specific processing associated with the handling and delivery of e-mail, voice-mail, short message service and paging traffic.

2.3.6.8 Video Services Subsystem

The Video Services Subsystem is responsible for the processing associated specifically with video services, in all its forms. Several different subsystems may be established for different types of video and image services.

3. Pedagogical Scenarios

This section discusses three typical call scenarios from the perspective of message flow. This facilitates an understanding of the interaction between subsystems during registrations and call setups. It should be understood that the message flows and/or primitive exchanges described in this section are between subsystems and can be, but are not necessarily, between hardware platforms.

3.1 Registration at Power Up

Figure 6:
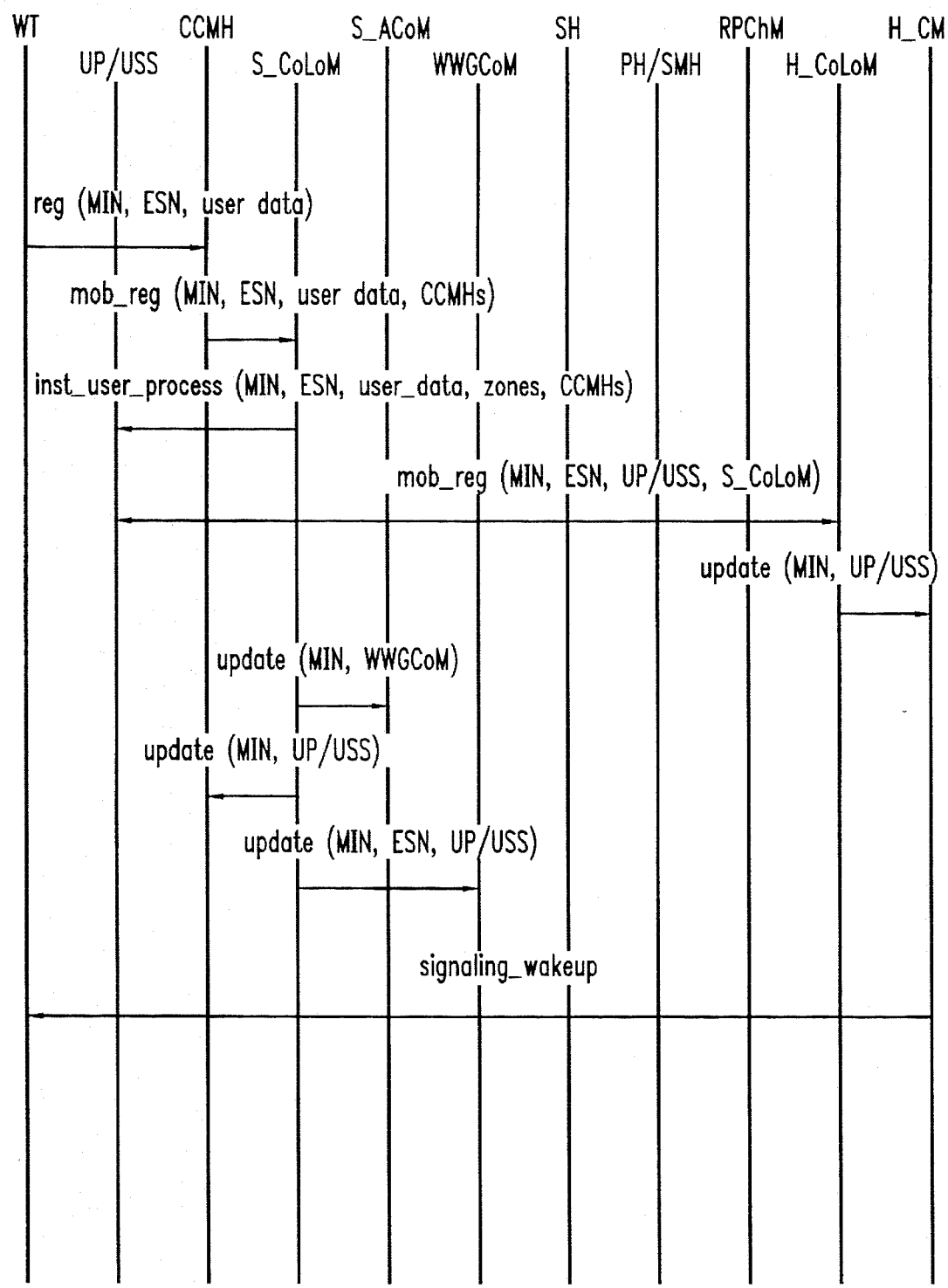
FIG. 6 depicts a diagram of the message flows another illustrative controller as shown in FIG. 3.

The flow of information during a typical power-up registration is illustrated in FIG. 6. When a wireless terminal is turned on, it locates and locks onto a paging channel. Once synchronized, it begins to acquire system parameters. Of particular interest here is the parameter indicating whether or not power-up registration is required. If it is, the wireless terminal generates a Registration message and sends it to the radio port via the access channel. The radio port forwards the Registration message to the Control Channel Message Handling Subsystem over a pre-established VP/VC. The Registration message contains the MIN, ESN, user-specific data, together with information used by the media access control ("MAC") algorithms of the access channel. The user-specific data includes the value of the MOB_TERM parameter indicating the willingness of the subscriber to accept incoming calls. Other user-specific data (e.g., mobility indexes, terminal capabilities) may be included in the Registration message in the future.

The Control Channel Message Handling Subsystem processes the Registration message and invokes a MOB_REG operation in the serving Configuration and Location Management Subsystem. The MOB_REG invocation contains the MIN, ESN, user-specific data, and the identity of the Control Channel Message Handling Subsystem able to communicate with the wireless terminal. The serving Configuration and Location Management Subsystem processes the MOB_REG invocation and assigns a User Signaling Server Subsystem, ATM Connection Management Subsystem and Wireless-Wired Gateway Connection Management Subsystem. The serving Configuration and Location Management Subsystem initiates a User Process on the User Signaling Server Subsystem it selected via an INST_USER_PROCESS invocation. This invocation contains the user-specific data included in the MOB_REG invocation. If the wireless terminal is in its home network and is in one of its predesignated zones, the invocation also includes a list of zones which are to be maintained in the wireless terminal's zone list, and a list of Control Channel Message Handling Subsystems that are associated with the zones on the list. If the wireless terminal is not in its home system, or is in its home system but not in one of its predesignated zones, the INST_USER_PROCESS invocation only includes a list of the Control Channel Message Handling Subsystems associated with the zone in which the user currently is located.

A Call Management Subsystem is assigned to the wireless terminal once the User Process has been initiated. Two cases are considered here. The first pertains to wireless terminals operating in their home system. In this case, the serving Configuration and Location Management Subsystem uses the Call Management Subsystem assigned to the user when it was activated. If, in contrast, the wireless terminal is not in its home system, the serving Configuration and Location Management Subsystem identifies the wireless terminal's Home-Configuration and Location Management Subsystem ("H_Configuration and Location Management Subsystem") from its MIN and sends it a MOB_REG message. The invocation includes the wireless terminal's MIN together with the location of the User Process and is delivered via a pre-established signaling VP/VC. Note that User Signaling Server Subsystems have pre-established VP/VCs to the gateway Configuration and Location Management Subsystems of all systems with which the serving system has a business arrangement. FIG. 6 illustrates the case in which the wireless terminal is not in its home system.

After this phase of the registration process is complete, the Configuration and Location Management Subsystems in both networks update other subsystems within their networks via a series of UPDATE messages. In the serving network, for example, the Configuration and Location Management Subsystem contacts all of the Control Channel Message Handling Subsystems in the zone in which the wireless terminal is currently located, informing them in particular of the address of the User Process serving the wireless terminal. If the wireless terminal registered in one of its predesignated zones in its home network, then all of the Control Channel Message Handling Subsystems associated with all the zones in the wireless terminal's zone list are updated. This is required so that the Control Channel Message Handling Subsystem can forward subsequent Registration messages as well as Origination messages directly to the User Process.

The serving Configuration and Location Management Subsystem also updates the serving ATM Connection Management Subsystem with the address of the Wireless-Wired Gateway Connection Management Subsystem assigned the wireless terminal. This is done to ensure that the ATM Connection Management Subsystem contacts the correct Wireless-Wired Gateway Connection Management Subsystem if and when it becomes necessary to establish a connection between the wireless terminal and the land network. Finally, the serving Configuration and Location Management Subsystem preferably updates the Wireless- Wired Gateway Connection Management Subsystem with the MIN and ESN of the wireless terminal, as well as the location of its User Process. The Wireless-Wired Gateway Connection Management Subsystem uses the User Process location information as described in Sections 3.2 and 3.3 to establish the Packet Handling Subsystem to radio port portion of a connection.

In the home network, the Configuration and Location Management Subsystem updates the Call Management Subsystem with the MIN and User Process location. The Call Management Subsystem needs to know the location of the User Process so that it can contact the User Process with call or service requests. Once updated, the Call Management Subsystem contacts the User Process directly with a SIGNALING_WAKEUP invocation to inform the User Process that it now has an active signaling link with a Call Management Subsystem. The wireless terminal is fully registered at this point.

3.2 Wireless Terminal Originated Calls

Figure 7:
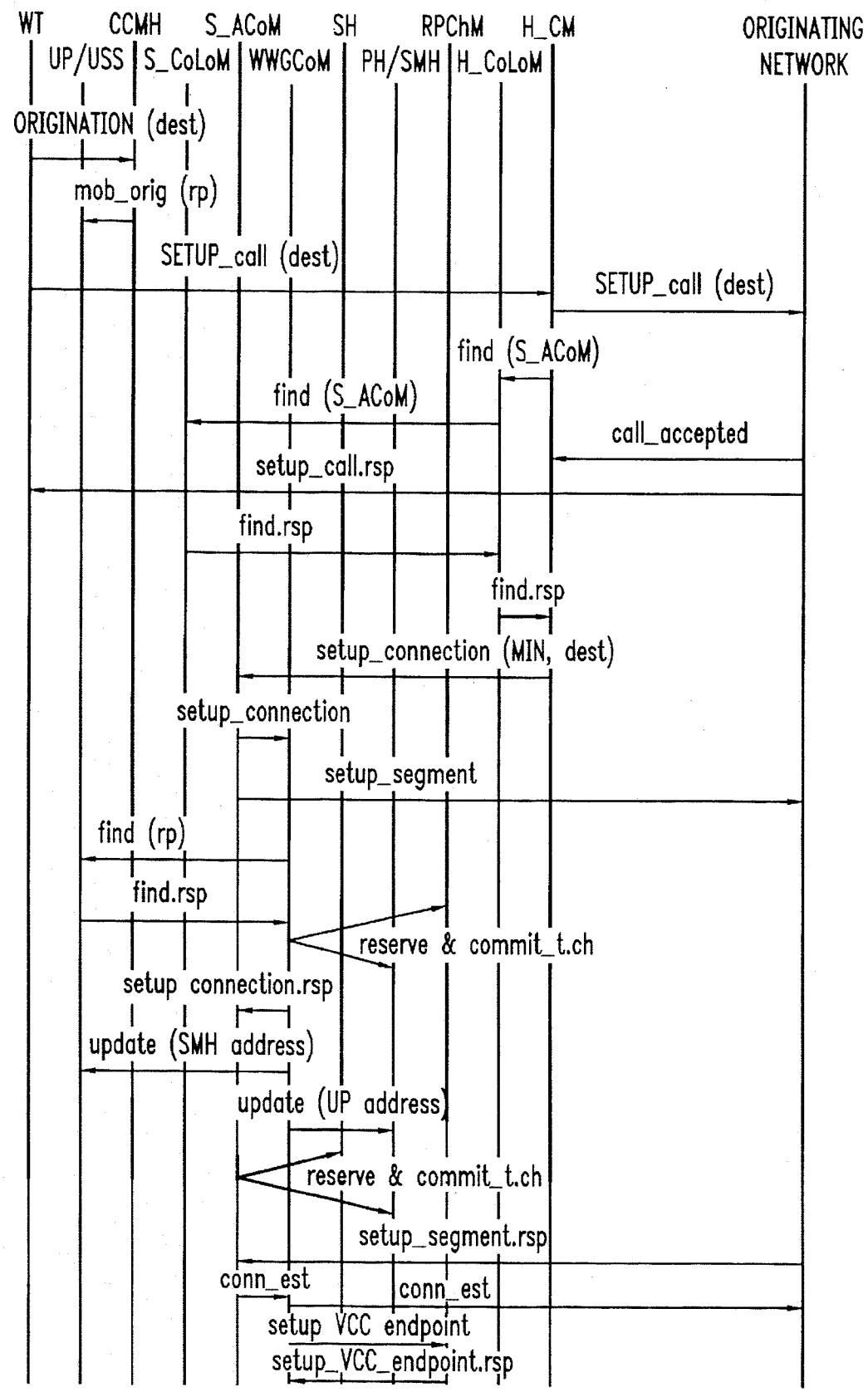
FIG. 7 depicts a diagram of illustrative message flows for a wireless terminal originated call.

The information flow for a wireless terminal originated call is shown in FIG. 7. In this example we consider the case in which a Speech Handling Subsystem is needed to convert compressed speech from the air interface to 64 Kbps PCM. We also assume that the wireless terminal is not in its home system.

The process starts when the wireless terminal generates an Origination message and sends it to the serving radio port on the reverse control (access channel). The radio port forwards the message to the Control Channel Message Handling Subsystem which, in turn, informs the User Process of the wireless terminal's desire to obtain service by sending it a MOB_ORIG message. The MOB_ORIG message contains the wireless terminal's identity as well as the identity of the radio port the wireless terminal accessed. The User Process processes the MOB_ORIG invocation and invokes a SETUP_CALL operation in the wireless terminal's Call Management Subsystem. This invocation includes the identity of the called party and an embedded request for a connection to the called party.

The wireless terminal's Call Management Subsystem then contacts the called party's Call Management Subsystem with a SETUP_CALL message to determine whether or not the called party is willing to accept the call. In parallel, the wireless terminal's Call Management Subsystem queries its H-Configuration and Location Management Subsystem to determine the ATM Connection Management Subsystem best able to handle the call. To do this, the H_Configuration and Location Management Subsystem contacts the serving Configuration and Location Management Subsystem with a FIND (ATM Connection Management Subsystem) message. The H_Configuration and Location Management Subsystem forwards the information in the Configuration and Location Management Subsystem's response the wireless terminal's Call Management Subsystem. When the Call Management Subsystem receives a positive response from the called party's Call Management Subsystem indicating that the called party is willing to accept the call and the identity of the ATM Connection Management Subsystem in the serving network has been established, the connection establishment phase is entered. Note that for wireless terminals operating in their home systems there is no distinction between Home and serving Configuration and Location Management Subsystems.

The connection establishment phase commences with the Call Management Subsystem invoking a SETUP_CONNECTION operation in the serving ATM Connection Management Subsystem. The invocation includes the MIN of the calling party and the address of the called party. The serving ATM Connection Management Subsystem associates the MIN of the calling party with a Wireless-Wired Gateway Connection Management Subsystem and sends it a SETUP_CONNECTION message. The invocation includes the MIN of the calling party. In parallel, the serving ATM Connection Management Subsystem routes a segment from the point-of-presence of the land network to the Speech Handling Subsystem assigned by the serving ATM Connection Management Subsystem to handle the call. The serving ATM Connection Management Subsystem also invokes a SETUP_SEGMENT operation in the land network ATM Connection Management Subsystem serving the point-of-presence requesting that it establish a segment between the point-of-presence and the called party.

As discussed above, the Wireless-Wired Gateway Connection Management Subsystem is responsible for establishing the portion of the connection between the radio port serving the wireless terminal and the Packet Handling Subsystem. This amounts to selecting one of the pre-established VPS/VCSs. To determine the radio port best able to handle the call, the Wireless-Wired Gateway Connection Management Subsystem queries the User Process with a FIND(radio port) message. When it receives a response, the Wireless-Wired Gateway Connection Management Subsystem commands both the Radio Port Channel Management Subsystem associated with the radio port and the ATM Channel Management Subsystem supporting the Packet Handling Subsystem assigned by the Wireless-Wired Gateway Connection Management Subsystem to handle the call, to reserve and commit channels. This effectively establishes a connection between the wireless terminal and the Packet Handling Subsystem. The Wireless-Wired Gateway Connection Management Subsystem then responds to the SETUP_CONNECTION request from the serving ATM Connection Management Subsystem, informing it that a connection terminating on the Packet Handling Subsystem identified in the response has been established. At this time the Wireless-Wired Gateway Connection Management Subsystem updates the User Process and Signaling Message Handling Subsystem (normally co-located with the Packet Handling Subsystem) as to each others location so that they may exchange in-call signaling messages.

The serving ATM Connection Management Subsystem then establishes a connection between the Speech Handling Subsystem and the Packet Handling Subsystem. Recall that the serving ATM Connection Management Subsystem has already committed channels from the point-of-presence to the Speech Handling Subsystem. This is done by reserving and committing channels from the Speech Handling Subsystem to the Packet Handling Subsystem, through perhaps one (or several) ATM switch(s).

Once the ATM Connection Management Subsystem in the land network has completed establishing its segment, an end-to-end connection exists. The end-to-end connection consists of a connection between the land terminal and the Speech Handling Subsystem, a connection between the Speech Handling Subsystem and a Packet Handling Subsystem, and a connection between the Packet Handling Subsystem and the radio port. Once the serving ATM Connection Management Subsystem ascertains that the end-to-end connection does in fact exist, it notifies the Wireless-Wired Gateway Connection Management Subsystem which, in turn, invokes a SETUP_VCC_ENDPOINT operation in the Signaling Message Handling Subsystem. The Signaling Message Handling Subsystem translates this operation into an Alert With Information message which is sent to the wireless terminal on the traffic channel. This initiates ringback in the wireless terminal and, optionally, instructs the wireless terminal how to map an incoming channel with a connection request. The latter is required when a wireless terminal has multiple active connections.

3.3 Wireless Terminal Terminated Calls

Figure 8:
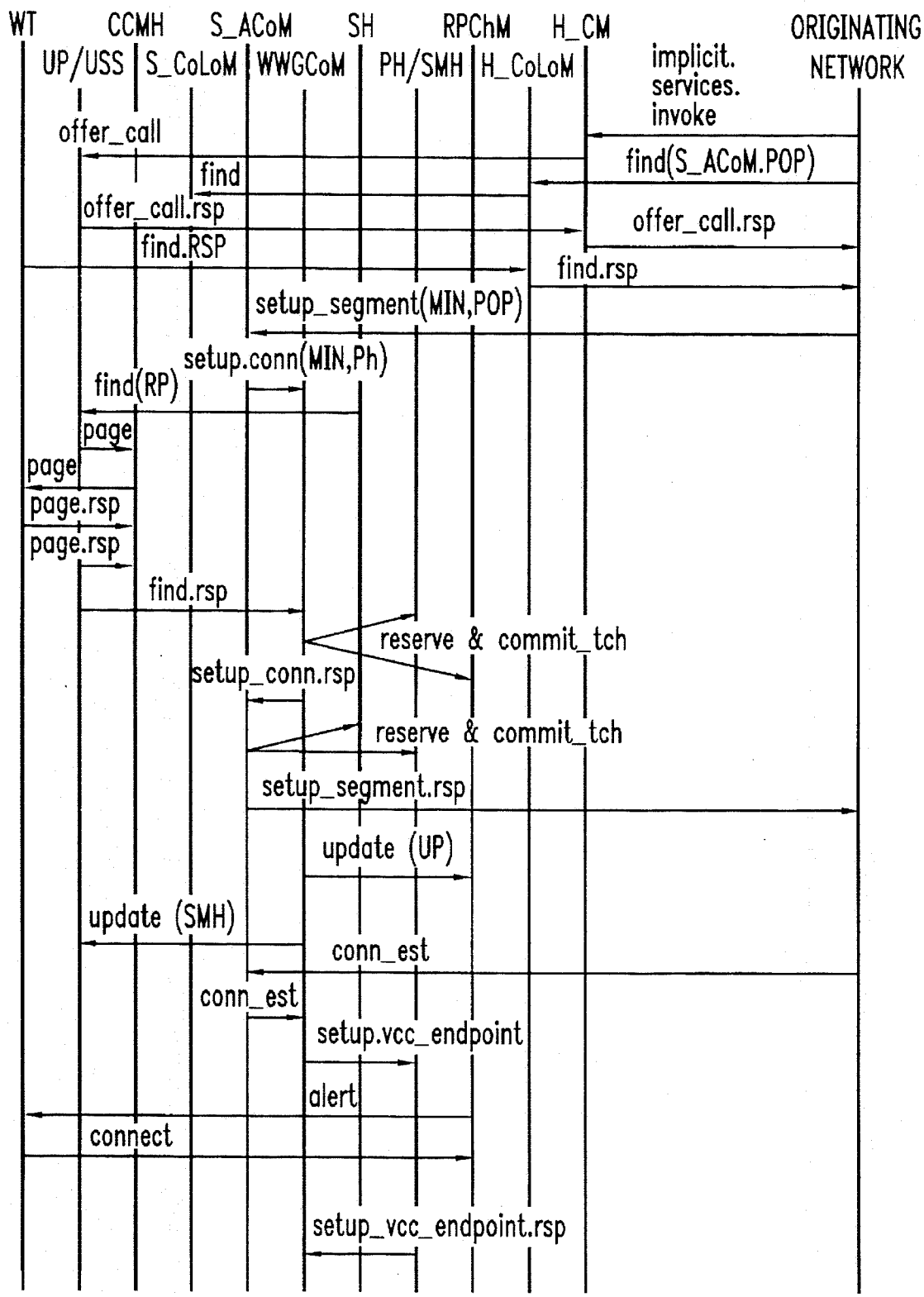
FIG. 8 depicts a diagram of illustrative message flows for a wireless terminal terminated call.

The flow of information during the establishment of a wireless terminal terminated call is depicted in FIG. 8. Once again it is assumed that a Speech Handling Subsystem is required and that the wireless terminal is not in its home system. For our purposes, the process begins when the Call Management Subsystem of the calling party contacts the wireless terminal's Call Management Subsystem, requesting it to invoke any implicit services activated by the wireless terminal subscriber. The wireless terminal's Call Management Subsystem offers the call directly to the User Process via an OFFER_CALL message.

The User Process replies positively to this request, indicating that it can accept the call. In parallel, the Call Management Subsystem for the calling party queries the wireless terminal's H_Configuration and Location Management Subsystem to determine the ATM Connection Management Subsystem to be used by the serving system to service the call and the point-of-presence through which connections to the wireless terminal are to be routed. The H_Configuration and Location Management Subsystem does not store this information locally and thus queries the serving Configuration and Location Management Subsystem. This is done via a FIND(ATM Connection Management Subsystem) message.

When the serving Configuration and Location Management Subsystem replies to this message, the H_Configuration and Location Management Subsystem in turn replies to the request of the calling party's Call Management Subsystem. When the Call Management Subsystem serving the calling party has also received an indication that the call has been accepted the call phase is considered complete.

The connection phase commences when the ATM Connection Management Subsystem serving the calling party network invokes a SETUP_SEGMENT operation in the ATM Connection Management Subsystem serving the wireless terminal. The SETUP_SEGMENT message contains the MIN of the called party and the point-of-presence through which the connection must be routed. The ATM Connection Management Subsystem serving the wireless terminal associates the MIN with a Wireless-Wired Gateway Connection Management Subsystem and invokes within it a SETUP CONNECTION operation. In the mean time, the ATM Connection Management Subsystem serving the wireless terminal routes a segment from the point-of-presence to a Speech Handling Subsystem.

The Wireless-Wired Gateway Connection Management Subsystem associates the MIN with a User Process and queries the User Process to find the radio port able to communicate with the wireless terminal. This is done via a FIND(radio port) message. The User Process does not have this information stored locally and thus pages the wireless terminal. The paging process is carried out via the Control Channel Message Handling Subsystems in the area where the wireless terminal last registered. When the wireless terminal responds to the page, the Control Channel Message Handling Subsystem processing the response forwards the identity of the radio port that received it to the User Process. The User Process in turn reports the identity of the radio port to the Wireless-Wired Gateway Connection Management Subsystem.

The Wireless-Wired Gateway Connection Management Subsystem then instructs the Radio Port Channel Management Subsystem and the ATM Channel Management Subsystem supporting the Packet Handling Subsystem assigned to handle the call to reserve and commit a channel between the radio port and the Packet Handling Subsystem. This effectively establishes a connection from the wireless terminal to the Packet Handling Subsystem. The Wireless-Wired Gateway Connection Management Subsystem then replies to the SETUP_CONNECTION request from the ATM Connection Management Subsystem serving the wireless terminal. Once the ATM Connection Management Subsystem serving the wireless terminal knows the location of the Packet Handling Subsystem assigned by the Wireless-Wired Gateway Connection Management Subsystem to handle the call it establishes a connection between the Speech Handling Subsystem and Packet Handling Subsystem. This is done by sending a RESERVE&COMMIT message to the ATM Channel Management Subsystems supporting them. At this point the ATM Connection Management Subsystem serving the wireless terminal replies to the SETUP_SEGMENT message sent by the ATM Connection Management Subsystem serving the calling party at the start the connection establishment phase.

When the end-to-end connection has been established, the ATM Connection Management Subsystem serving the calling party sends a CONN_EST message to the ATM Connection Management Subsystem serving the wireless terminal, which in turn passes it on to the Wireless-Wired Gateway Connection Management Subsystem. The Wireless-Wired Gateway Connection Management Subsystem invokes a SETUP_VCC_ENDPOINT operation in the Signaling Message Handling Subsystem to establish the mapping between the connection and a specific service request. The Signaling Message Handling Subsystem translates this invocation into an Alert With Information message which is sent to the user on the traffic channel to instruct the wireless terminal to alert the subscriber. When the user answers, a Connect order is sent to the radio port on the reverse traffic channel. The Packet Handling Subsystem serving the radio port routes this message to the Signaling Message Handling Subsystem, which completes the process by sending a SETUP_VCC_SEGMENT.RSP message to the Wireless-Wired Gateway Connection Management Subsystem.

4. Network Elements

Figure 9:
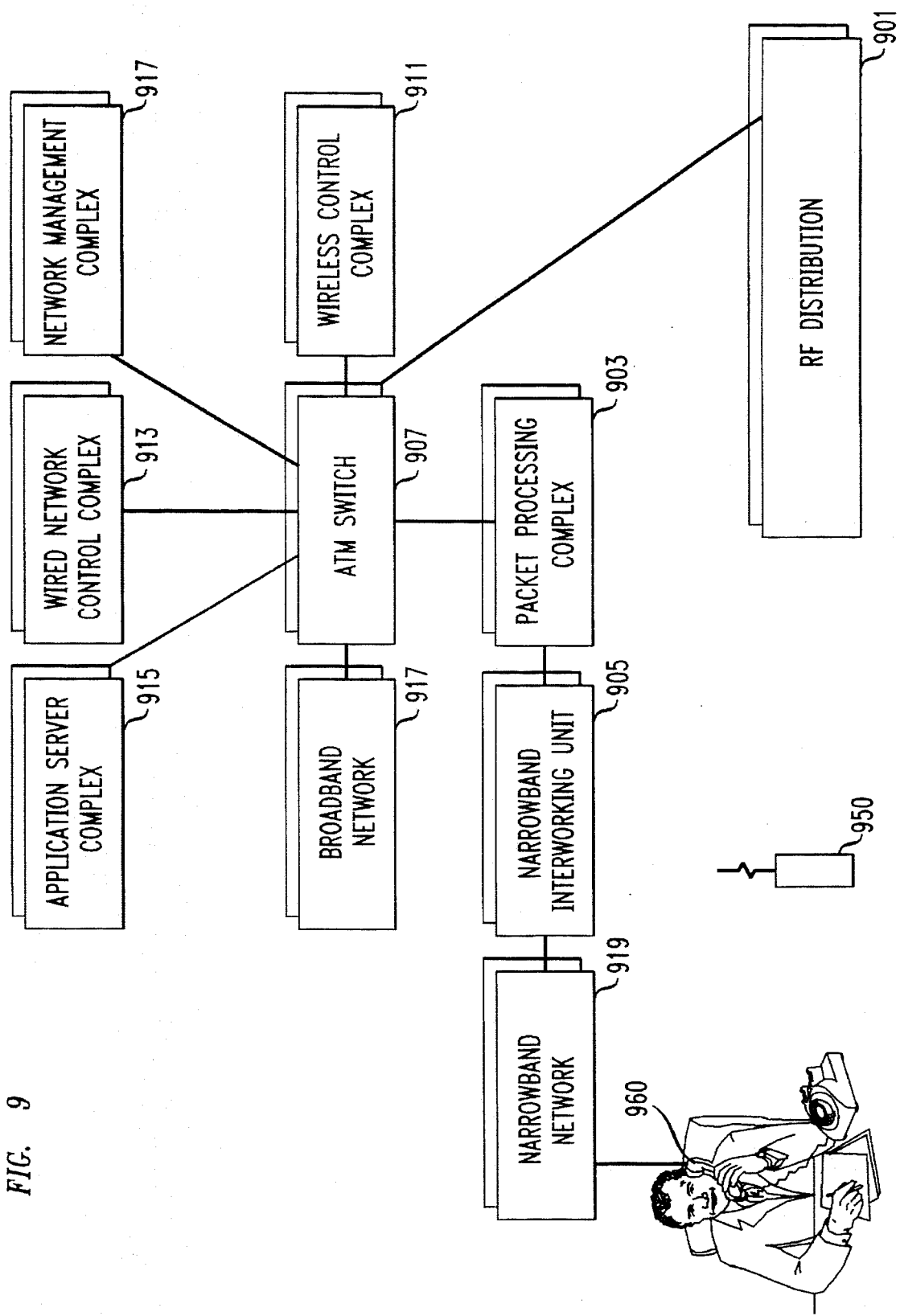
FIG. 9 depicts a block diagram of the interconnectivity of the network elements in the exemplary embodiment.

The material in this section describes how the subsystems described in Section 2 are preferably grouped into network elements in accordance with the exemplary embodiment. As illustrated in FIG. 9, eight units are:
RF Distribution Unit 901;
Packet Processing Complex 903;
Narrowband Interworking Unit 905;
ATM Switch 907;
Wireless Control Complex 911;
Wired Network Control Complex 913
Application Server Complex 915; and
Network Management 917

4.1 RF Distribution Unit

RF Distribution Unit 901 preferably comprises: radio ports, radio port multiplexors and "landline" facilities. Radio ports and radio port multiplexors may be arranged in tree, ring or mesh configurations, as dictated by cost and reliability targets as well as the availability of facilities.

Figure 10:
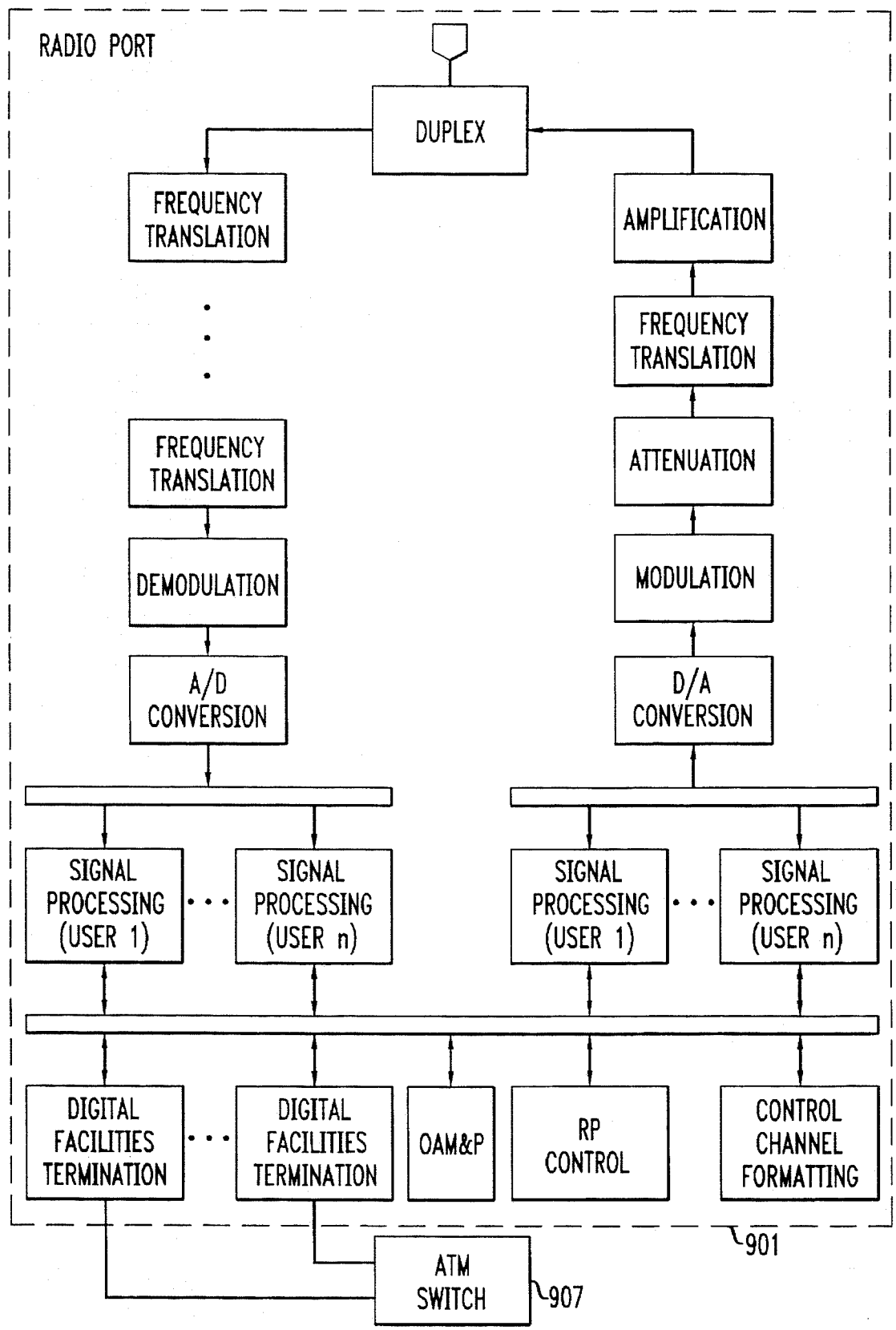
FIG. 10 depicts a block diagram of a radio port in the exemplary embodiment.
Figure 20:
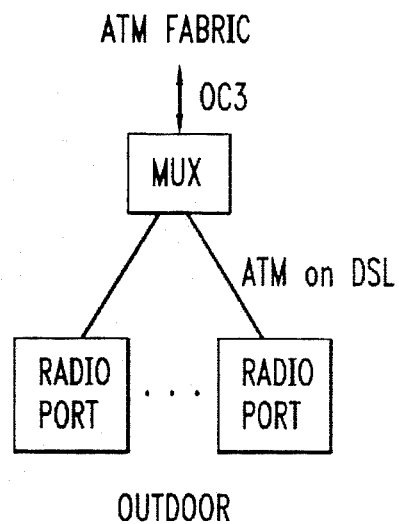
FIG. 20 is a typical configuration for the RF Distribution Unit.
Figure 21:
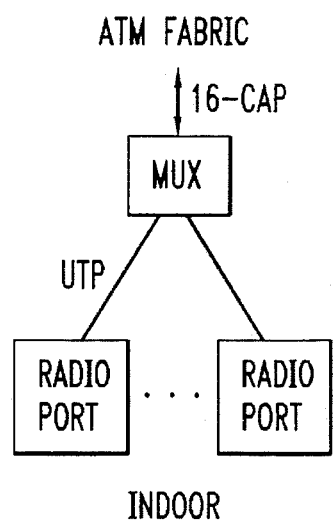
FIG. 21 is another typical configuration for the RF Distribution Unit.
Figure 22:
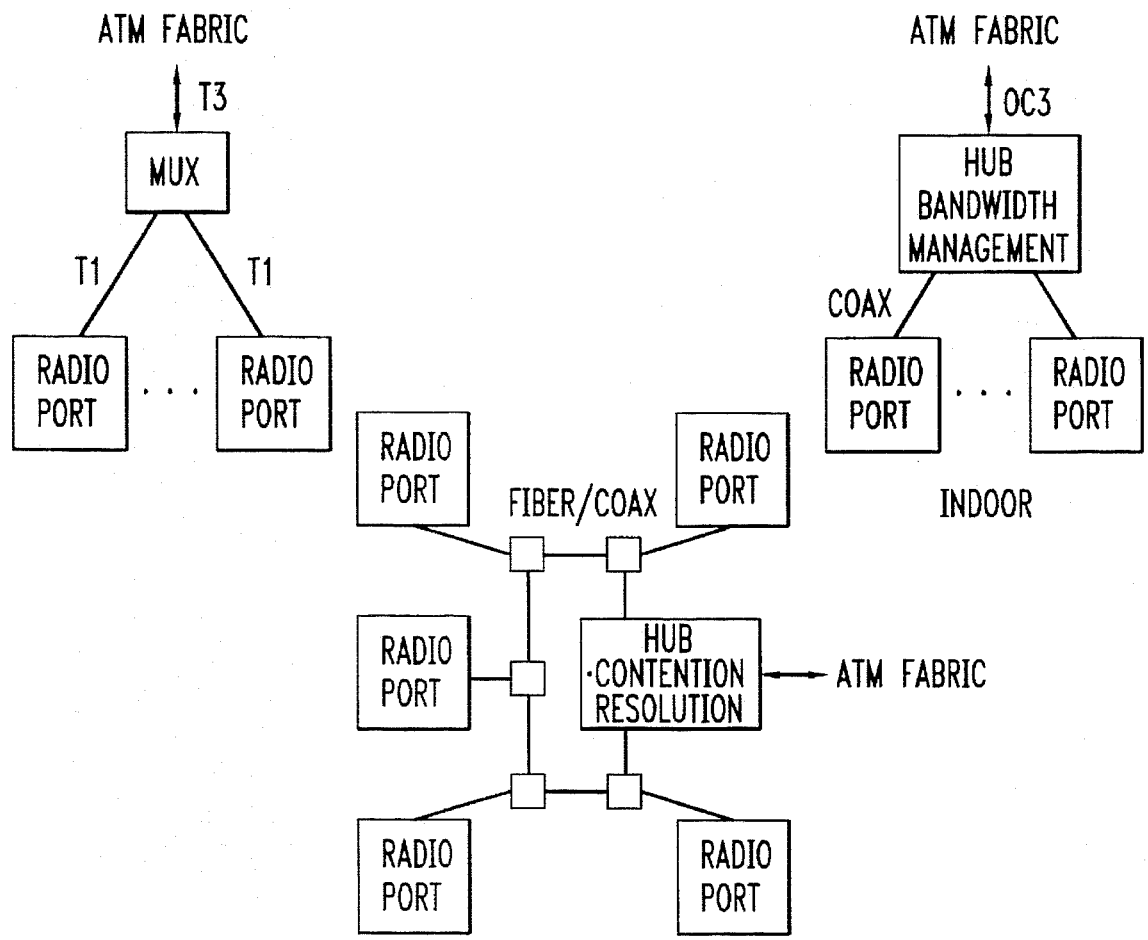
FIG. 22 is another typical configuration for the RF Distribution Unit.

A block diagram of a typical radio port is given in FIG. 10. Note that a one-to-one correspondence between the individual functional blocks and physical processors is neither implied nor warranted, although the limitations of available technology or requirements such as the ability to support a variety of air-interfaces and/or digital facilities interfaces might lead to such a design. FIGS. 20, 21 and 22 depict typical configurations for the RF Distribution Network.

4.2 Packet Processing Complex

Figure 11:
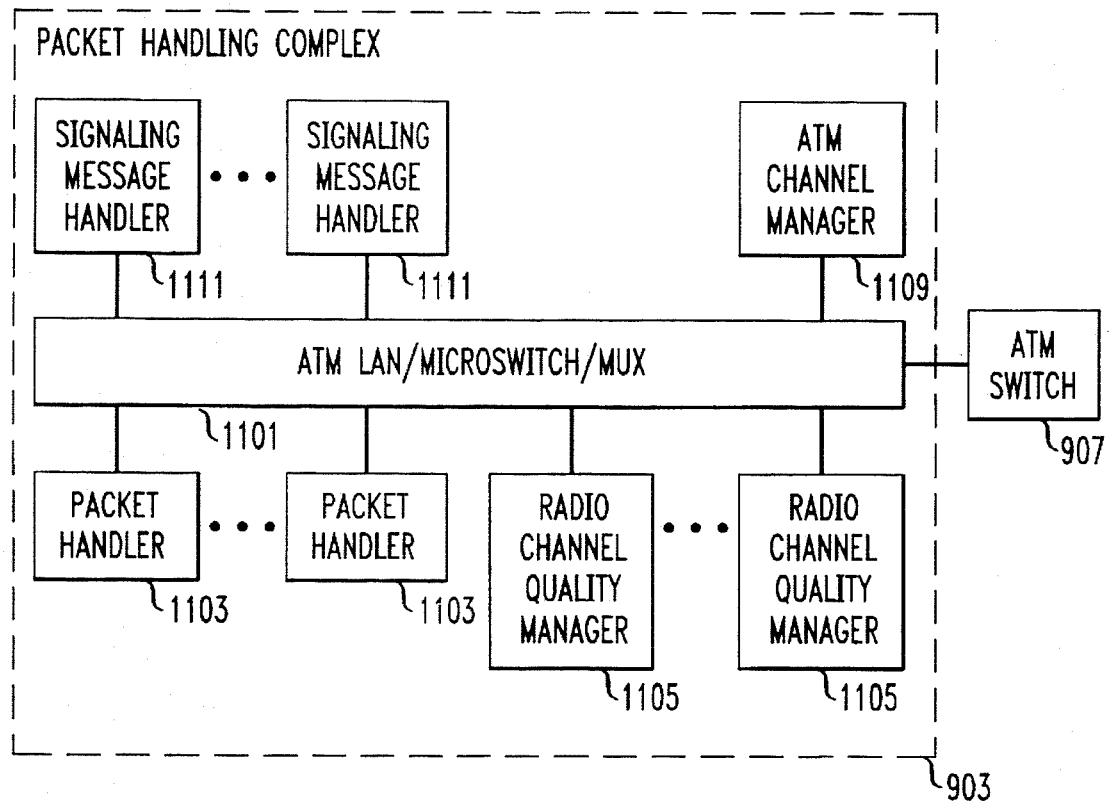
FIG. 11 depicts a block diagram of the Packet Processing Complex.

As depicted in FIG. 11, Packet Processing Complex 903 preferably comprises: one or more packet handlers 1103, which separate signaling from voice, one or more signal message handlers 1111 to terminate the air interface signaling protocol, one or more radio channel managers 1105, which process radio channel quality data from the wireless terminals and/or the radio port, ATM channel manager 1109, which handlers VP/VC translation tables at the network elements, and switch 1101, all interconnected as shown. Depending on the particular application, switch 1101 could be a LAN, microswitch or macroswitch. In any case, all but the smallest of systems would likely have multiple packet processing complexes, each serving several radio ports. For very small systems a single hardware platform housing this functional block might suffice.

4.3 Narrowband Interworking Unit

Figure 12:
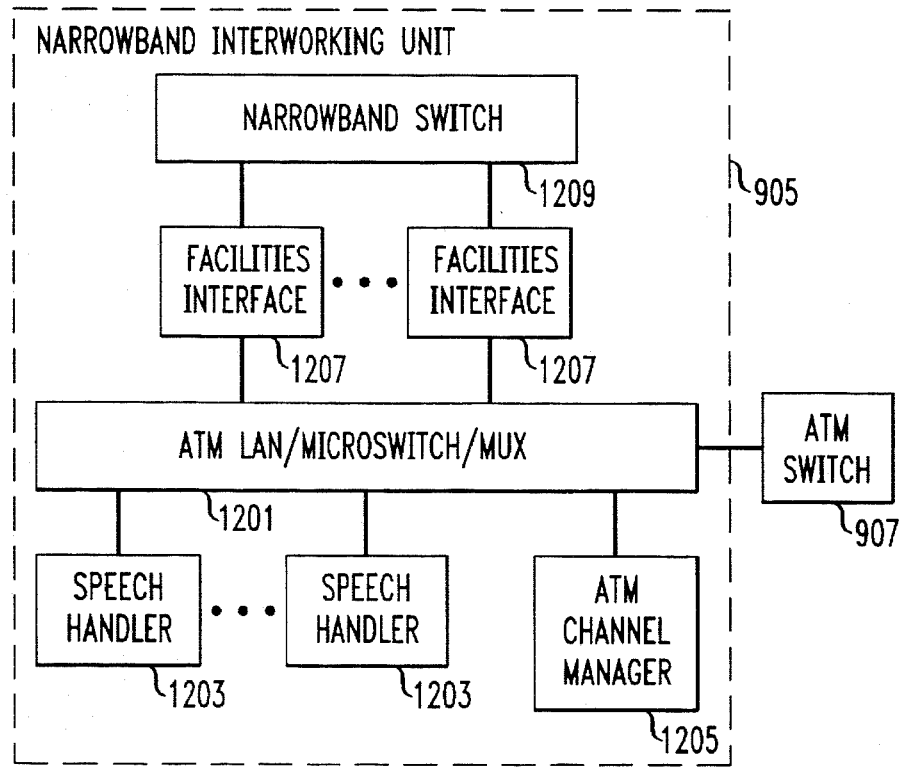
FIG. 12 depicts a block diagram of the Narrowband Internetworking Unit.

The preferred role of Narrowband Interworking Unit 905 is to convert the low bit rate coded speech carried throughout the wireless network and across the air-interface into a form compatible with the narrowband land network (e.g., PSTN). To this end, as illustrated in FIG. 12, Network Interface Unit 905 preferably comprises: one or more speech handlers 1203, which perform speech transcoding, ATM channel changer 1205, which handles VP/VC translation tables, one or more facilities interface 1207, which terminates digital facilities, narrowband switch 1209, which interfaces to the narrowband network and switch 1201, all interconnected as shown. Depending on the particular application, switch 1201 could be a LAN, microswitch or macroswitch. It is preferred that hardware platforms supporting Narrowband Interworking blocks will be located as close as possible to narrowband network interface points so as to maximize the savings associated with transporting compressed speech and to minimize access charges.

4.4 ATM Switch

ATM Switch 907 is preferably an off-the-shelf ATM switch, which is available from several manufacturers. The features normally associated with contemporary switches, e.g., AT&T's 5ESS® switch, are advantageously moved to Wired Network Control Complex 913 and Application Server Complex 915. This not only enables the architecture to be scalable, but also facilitates the development and introduction of new features in a multi-vendor environment. Note that it is not necessary that ATM Switch 907 can support both wireless and wireline services.

4.5 Wireless Control Complex

Figure 13:
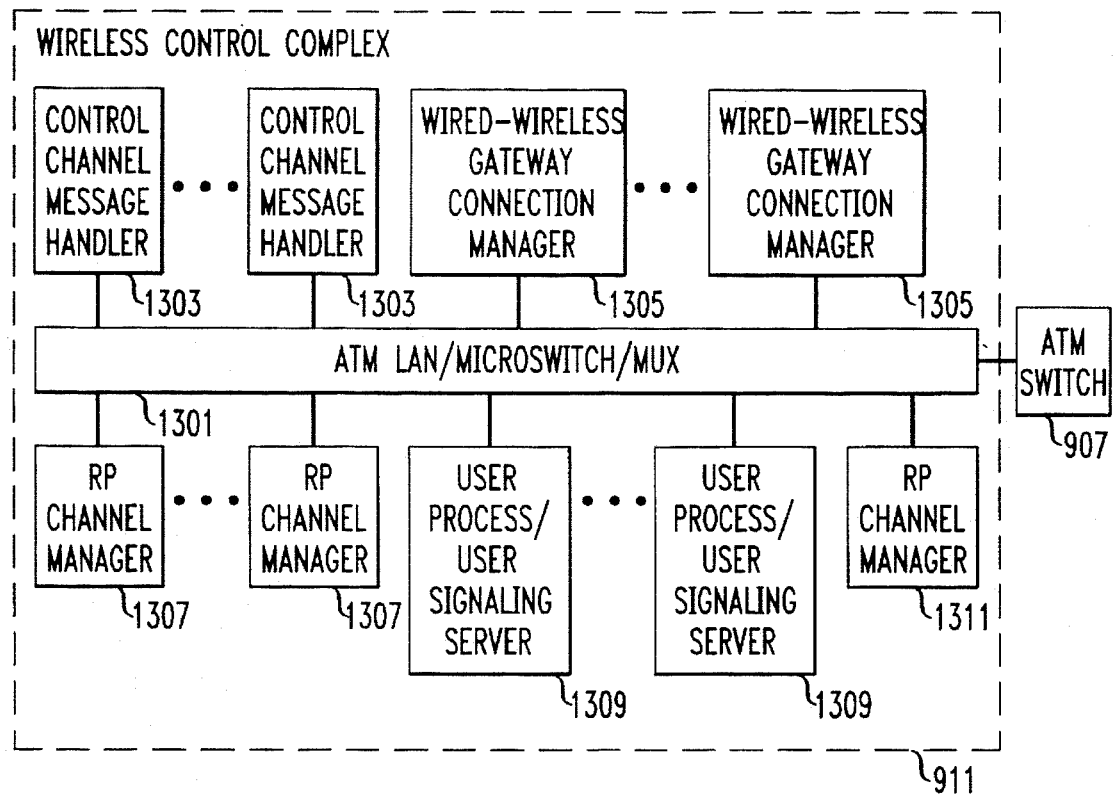
FIG. 13 depicts a block diagram of the Wireless Control Complex.

As shown in FIG. 13, Wireless Control Complex 911 preferably comprises: one or more Control Channel Message Handlers 1301, one or more Wireless-Wired Gateway Connection Managers 1305, one or more Radio Port Channel Managers 1307, one or more User Process/User Signaling Servers 1309, ATM Channel Manager 1311 and switch 1301, all interconnected as shown.

The Control Channel Message Handlers 1301 are preferably the embodiment of the Control Channel Message Handling Subsystem and act as signaling fixed-points for wireless terminals that are active in the system but not engaged in a call. The Wireless-Wired Gateway Connection Mangers 1305 are preferably the embodiment of the Wireless-Wired Gateway Connection Management Subsystem and establish the routes between wireless network elements such as Speech Handlers 1203 and the Packet Handlers 1103.

The Radio Port Channel Managers 1307 are preferably the embodiment of the Radio Port Chattel Management Subsystem and manage RF resources and act as ATM channel managers for the radio ports they support. The User Process/User Signaling Servers 1309 are preferably the embodiment of the User Signaling Server Subsystem and represent wireless terminals in negotiations with the network concerning the service(s) to be provided. Depending on the particular application, switch 1301 could be a LAN, microswitch or macroswitch. The ATM Channel Manager 1311 handles the VP/CP translates tables for the Wireless Control Complex.

It is preferred that each Wireless Control Complex 911 preferably support multiple RF Distribution Units, Packet Processing Complexes and Narrowband Interworking Units.

4.6 Wired Network Control Complex

Figure 14:
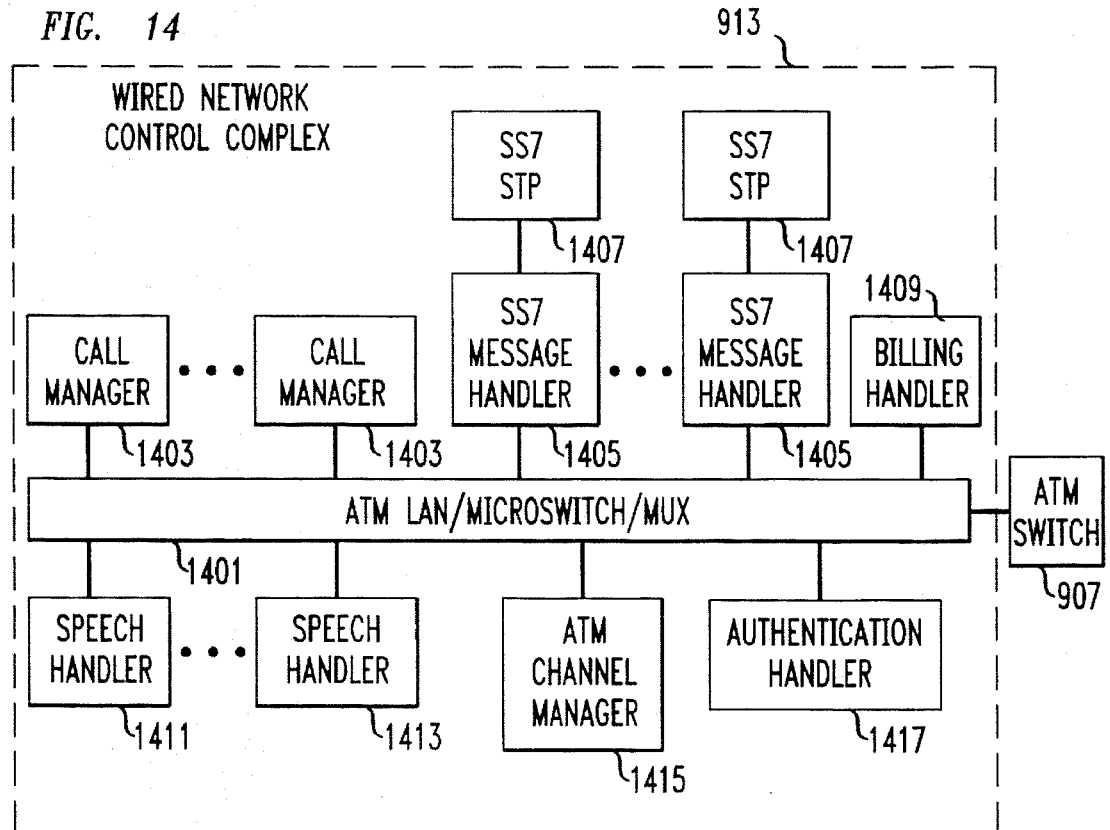
FIG. 14 depicts a block diagram of the Wired Network Control Complex.

As shown in FIG. 14, Wired Network Control Complex 913 preferably comprises: one or more Call Managers 1403, one or more SS7 Message Handlers 1405 (and associated SS7 Signaling Transport Point 1407), Billing Handler 1409, Configuration and Location Manager 1411, Connection Manager 1413, ATM Channel Manager 1415, Authentication Handler 1417 and switch 1401, interconnected as shown.

Call Managers 1403 preferably embody the Call Management Subsystem, SS7 Message Handlers 1405 preferably embody the SS7 Message Handling Subsystem, SS7 Signaling Transport Point, Billing Handler 1409 preferably embodies the Billing Subsystem, Configuration and Location Manager 1411 preferably embodies the Configuration and Location Management Subsystem, Connection Manager 1413 preferably embodies the Connection Management Subsystem, ATM Channel Manager 1415 preferably embodies the ATM Channel Management Subsystem and Authentication Handler 1417 preferably embodies the Security Subsystem. Depending on the particular application, switch 1401 could be a LAN, microswitch or macroswitch.

From a functional perspective, Wired Network Control Complex 913 preferably provides:

call processing;

the allocation of wireless network control resources with the help of the Configuration and Location Management Subsystem:

network-level routing with the ATM Connection Management Subsystem;

the generation of billing records with the Billing subsystem;

subscriber and/or wireless terminal authentication with the Security Subsystem; and interfaces to signaling networks such as SS7 via specialized handlers that terminate physical, link and possibly network and transport layers.

Because typical embodiments of the present invention are likely to comprise only one Wired Network Control Complex, it is preferred that particular attention be paid to the reliability aspects of prospective platforms supporting this complex.

4.7 Application Server Complex

Figure 15:
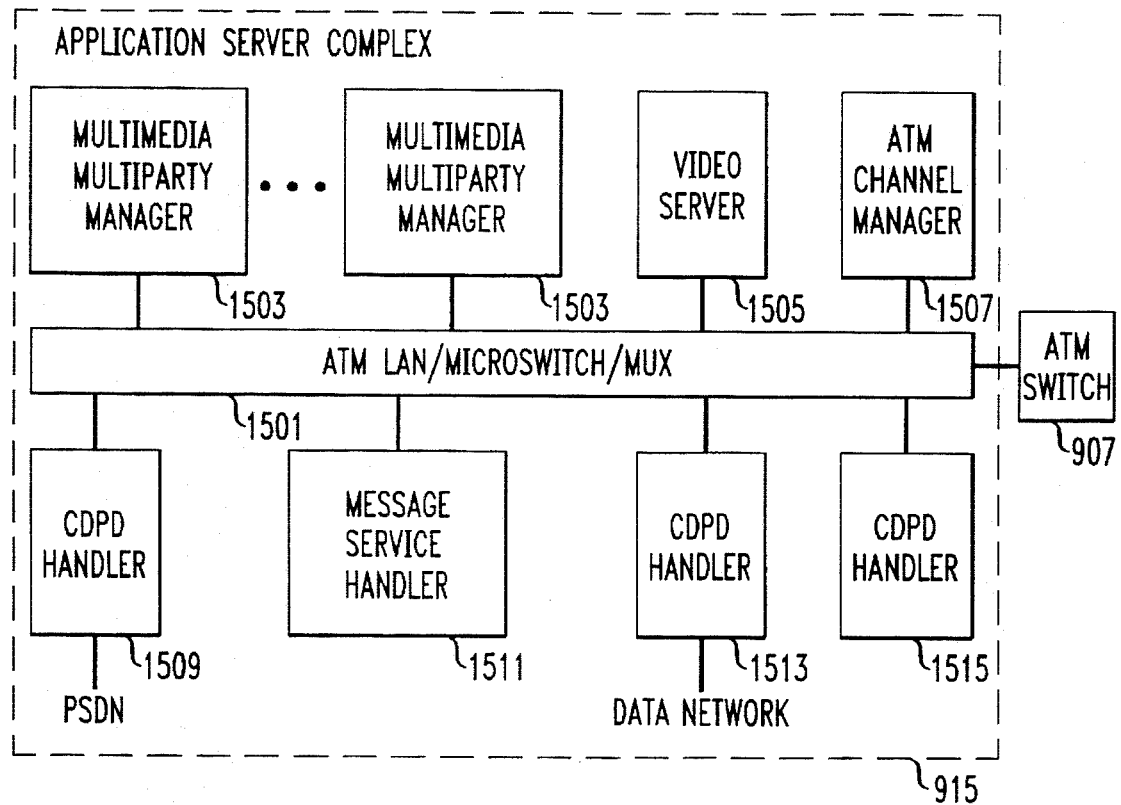
FIG. 15 depicts a block diagram of the Application Server Complex.

Application Server Complex 915 enjoys the same level of abstraction in the architecture as the Wired Network Control Complex 913, but, as the name suggests, the functions provided by Application Server Complex 915 are service-specific in contrast to those in the Wired Network Control Complex 913, which tend to be more generic. Referring to FIG. 15, Application Server Complex 915 preferably comprises one or more Multimedia Multiparty Managers 1503

(which preferably embody the Multimedia Multiparty Management Subsystem), Video Server 1505 (which preferably embodies the Video Service Subsystem), ATM Channel Manager 1507, CDPD Handler 1509 and Data Handler 1513 (which together embody the Packet Data Handling Subsystem), Message Service Handler 1511 (which embodies the Message Services Subsystem), Fax Handler 1515 (which embodies the Fax Handling Subsystem), and switch 1501, all interconnected as shown. Depending on the particular application, switch 1501 could be a LAN, microswitch or macroswitch.

Note that the call processing associated with a given application can be moved from Application Server Complex 915 to Call Managers 1403 in Wired Network Control Complex 913 when the service "matures" or if performance becomes an issue.

4.8 Network Management Complex

Figure 16:
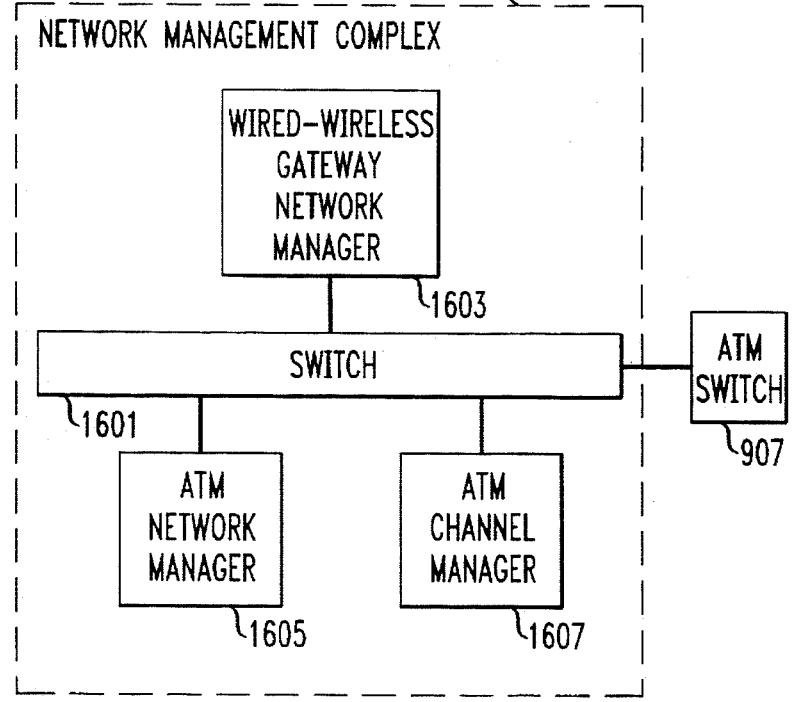
FIG. 16 depicts a block diagram of the Network Management Complex.

Referring to FIG. 16, Network Management Complex 917 preferably comprises: Wireless-Wired Gateway Network Manager 1603 (which preferably embodies the Wireless-Wired Gateway Network Management Subsystem), ATM Network Manager 1605 (which preferably embodies the ATM Network Management Subsystem), ATM Channel Manager 1607, and ATM switch 1601, all interconnected as shown. Depending on the particular application, switch 1601 could be a LAN, microswitch or macroswitch.

5. Hand-Off Management

Hand-Off is a process of changing the route of information flow to and/or from the wireless terminal to a fixed point (e.g., a radio port) to enhance the quality of information transport, or to avoid degradation of information transport quality resulting from mobility or changes in interference patterns. Additionally, spread spectrum based air interfaces (e.g., CDMA) enable multiple routes between the wireless terminal and a fixed point in the network to coexist simultaneously for the purpose of providing a better information transport quality than possible on any one route alone.

A "hard hand-off" is a hand-off that sets up a new route and almost concurrently tears down the old route. When a hand-off adds a new route without almost concurrently tearing down the old route, it can be "soft," "softer," or a "semi-soft." A "softer hand-off" involves two sectors of the same radio port. When diversity routes involve different radio ports, a common Frame Selector selects the best quality frame from among those arriving over diverse routes.

In the exemplary embodiment, the Frame Selector (not shown) is part of Packet Handler 1103. Furthermore, in the exemplary embodiment, each Packet Handler (with associated Frame Selector) preferably supports multiple radio ports through radio port multiplexors. This is advantageous because it enables each Packet Handler to be the fixed point for a collection of radio ports. When a Packet Handler is the fixed point for a collection of radio ports, each radio port in the collection is said to be "associated" with the Packet Handler.

ATM network 907 enables any radio port in RF Distribution Unit 901 to reach any Packet Handler 1103, whether or not the radio port is associated with that Packet Handler.

When the new and old routes of a hand-off involve radio ports that are all associated with a single Packet Handler, then a "fist hand-off" is advantageously enabled, which will be discussed in detail below. On the other hand, when the new and old routes of a hand-off involve radio ports that are associated with more than one Packet Handler, and the respective Packet Handlers are reached by the respective radio ports via different ATM switches, then a "slow hand-off" advantageously occurs, which will be discussed in detail below.

Wireless access technologies that do not use diverse air routes (e.g., AMPS, IS-54 TDMA) in contrast to those that do (e.g., IS-95 CDMA) preferably employ "hard hand-offs." A hard hand-off can be, in addition, characterized as either fast or slow. Wireless access technologies that do use diverse air routes (e.g., IS-95 CDMA) preferably employ "soft hand-offs" through the use of a Frame Selector (and associated Packet Handler). A soft hand-off can be, in addition, characterized as either fast or slow depending on whether the germane radio ports share a common Packet Handler. Hard hand-offs are additionally advantageously used in cases when there is a resource shortage and when the hand-off involves different access technologies (e.g., CDMA and AMPS).

The exemplary embodiment supports hard hand-offs (both fast and slow) and soft hand-offs (both fast and slow). The exemplary embodiment advantageously uses the advantages of ATM technology to enable hand-offs which are truly fast. In the exemplary embodiment, this is accomplished by either completely or partly pre-establishing the VP/VCs between a given Packet Handler and all of its associated radio ports (and radio port multiplexors and by only activating those resources that are actually needed at a given time. In the exemplary embodiment, the wireless terminal is provided with information during call set-up so that the wireless terminal can use this information to facilitate expedited activation and authentication over the new route. As will be discussed in greater detail below, it is preferred that the wireless terminal be given a matched set of VP/VCs, which the wireless terminal gives to a radio port with which the wireless terminal desires to establish a new route.

Because there is a limitation on the number space of VP/VCs and because large routing tables, which are technically advantageous, may be economically prohibitive in certain cases, the exemplary embodiment preferably also supports slow hand-offs. Fortunately, the exemplary embodiment enables even "slow" hand-offs to be completed relatively quickly through the use of partially pre-established VP/VCs.

Another aspect of hand-off management involves detecting the desirability of a hand-off. The decision of whether or not to hand-off, and if so, how, can involve numerous factors and perspectives. This is addressed in Section 5.1. The exemplary embodiment preferably uses wireless terminal directed hand-off, which is discussed in detail in Section 5.2. Section 5.3 describes techniques for expedited hand-offs using ATM VP/VCs. It should be understood that each of the techniques taught in Section 5.3 can be used with any hand-off direction technique.

5.1 Hand-Off Direction

In accordance with the IS-54 TDMA, IS-95 CDMA and GSM air interfaces, hand-offs are both initiated and directed by the network with the assistance of the wireless terminal, which assistance is in the form of Forward Channel quality measurements for neighboring base stations. In general, network initiated and directed hand-offs have been favored because it enables inexpensive wireless terminals, and because it facilitates authentication of the wireless terminal.

5.1.1 Network Directed Hand-Off

Although it is not preferred, the exemplary embodiment can support network initiated and directed hand-offs as follows. Radio Channel Quality Managers 1105 periodically supplies every active (in call) wireless terminal with a list of Neighbor Radio Ports. This information can be sent to the wireless terminal as signaling information via the Signaling Message Handler/Packet Handler and the radio port (or radio ports) currently serving the wireless terminal. The wireless terminal then collects measurements on the Pilot Channel or Forward Control Channel quality for the Neighbor Radio Ports and sends them back to the Radio Channel Quality Manager.

The Radio Channel Quality Manager can take the data from the wireless terminal, and use the Forward Channel quality and Reverse Channel quality measurements for the current radio port and decide if a hand-off is desirable and, if it is, which radio port (among the Neighbor Radio Ports) should be deemed the Target Radio Port.

The Radio Channel Quality Manager can then send a message to the Target Radio Port requesting a hand-off and supplying information to affect connections from the Target Radio Port to the wireless terminal and to the associated Packet Handler. If the Target Radio Port does not have sufficient resources or it finds the Reverse Channel Quality (which it can collect only after locking on to the wireless terminal) unacceptable, the Target Radio Port may deny the hand-off request. The Radio Channel Quality Manager can then try an alternate Target Radio Port or deny hand-off altogether. For the following reasons, network directed hand-off is not preferred in the exemplary embodiment.

As the number of wireless terminals increases, and as radio ports are operated in closer proximity to each other, the density of radio ports per unit area increase and with it the amount processing required by the Radio Channel Quality Manager. Another militating factor is that as the radio port density increases, the Reverse Channel will be required to carry more Forward Channel quality measurement data.

Furthermore, in a hybrid environment comprising both macro and microcells, the decision of whether to allocate new calls to macro or microcells must be based on the mobility behavior of the wireless terminal. It is suggested that it is economically prohibitive for the Radio Channel Quality Manager to monitor the movement of both active and idle wireless terminals for such purposes. The mobility of the wireless terminal is best monitored by each wireless terminal itself.

5.1.2 Wireless Terminal Directed Hand-Off

The exemplary embodiment of the present invention preferably supports wireless terminal directed hand-off, even though this requires the wireless terminal to be somewhat more complex:

In particular, although with network directed hand-off the wireless terminal merely transmits the channel quality measurements it was previously collecting, with wireless terminal directed hand-off the wireless terminal must be capable of negotiating a hand-off with a Target Radio Port while simultaneously supporting duplex communication with the original radio port(s). To this end, Section 5.2 describes wireless terminal directed hand-off as supported by the exemplary embodiment of the present invention.

We assume that the Radio Port Channel Manager periodically evaluates the status of each radio port it is controlling. This may include loading status (number of calls being handled, etc.) as well as any other factors which may affect the desirability of adding a new call or a hand-off to that radio port. Also, the Radio Port Channel Manager maintains, for each radio port, a relatively static list of Neighbor Radio ports (NL). Based on the periodic evaluation of radio port status, Radio Port Channel Manager creates a trimmed (or prioritized) list of Current Neighbors (CNL) for each radio port. The CNL is thus a prioritized list of Radio ports ready to accept a new call or a hand-off if the Reverse Channel Quality is acceptable. This list is sent or broadcast to the wireless terminal periodically based on the current radio port being used. The actual content will include at least the Pilot Channel for every radio port in CNL and may include the Neighbor Access Channels and Forward Control Channels as well. The trimming or prioritizing the NL to CNL implies a lower probability of a hand-off request failure due to resource unavailability.

An alternative to providing the CNL periodically is for the Radio Port Channel Manager to request every radio port to broadcast a radio port specific dynamic threshold periodically over the air interface. These thresholds are used by the wireless terminally decide if the Forward Channel Quality for a given radio port is acceptable. By choosing the threshold high for heavily loaded Radio ports the Radio Port Channel Manager indirectly informs the wireless terminal of the loading status of Radio ports. This has the advantage of providing finer granularity over the previously described CNL but makes the wireless terminal operation more complex. Another alternative is to adjust the Pilot Channel power to reflect the loading on an radio port (in effect, dynamically changing the coverage area). We have chosen the first approach in our proposal because it keeps the wireless terminal operations simple.

5.1.3 Authentication in a Wireless Terminal Directed Hand-Off Environment

When the exemplary embodiment supports wireless terminal directed hand-off, it is preferred that wireless terminal authentication be provided as follows. Because standard authentications take a significant amount of time, the goal of a fast hand-off is frustrated if the wireless terminal must go through the standard authentication procedure each time it requests a hand-off. Therefore, it is preferred that the wireless terminal go through the standard authentication process during call set-up, and thereafter, engage in an expedited well-known challenge-response exchange with the new Packet Handler to affect authentication without delaying the hand-off.

5.2 Procedure for Wireless Terminal Directed Hand-Off: Messaging Details

This section discusses the procedure and associated timing associated with wireless terminal directed hand-off using preestablished VP/VCs between radio ports and Packet Handler 1103, as supported by the exemplary embodiment. Resources are allocated to these pre-established VP/VCs only at hand-off. The procedures involving connection establishment at the time of hand-off (i.e., no preestablished VCCs) are similar.

As described earlier, using the Radio Port Neighbor list and corresponding measurements the wireless terminal initiates hand-off to a Target Radio Port. Initiation of hand-off by the wireless terminal is accomplished by sending a hand-off_request message on the access channel of the Target Radio Port and including the ID of the Packet Handler (typically represented by VP/VC identifiers that uniquely identify the Packet Handler) to which it is currently connected, so that the radio port can determine whether a fast hand-off is possible. The hand-off_request includes the information required for the radio port and Packet Handler to complete a fast hand-off if the radio port is associated with the Packet Handler which is currently carrying the call. Also included in the hand-off_request is information (e.g., the wireless terminal's ESN) that the Target Radio Port will need in order to decode the mobile's packets (e.g., CDMA packets) if it were to accept the hand-off_request. If the Target Radio Port has no resources available it can reject the hand-off request by transmitting a hand-off_reject message to the wireless terminal on the Forward Control Channel (Paging Channel) of the Target radio port.

Figure 17:
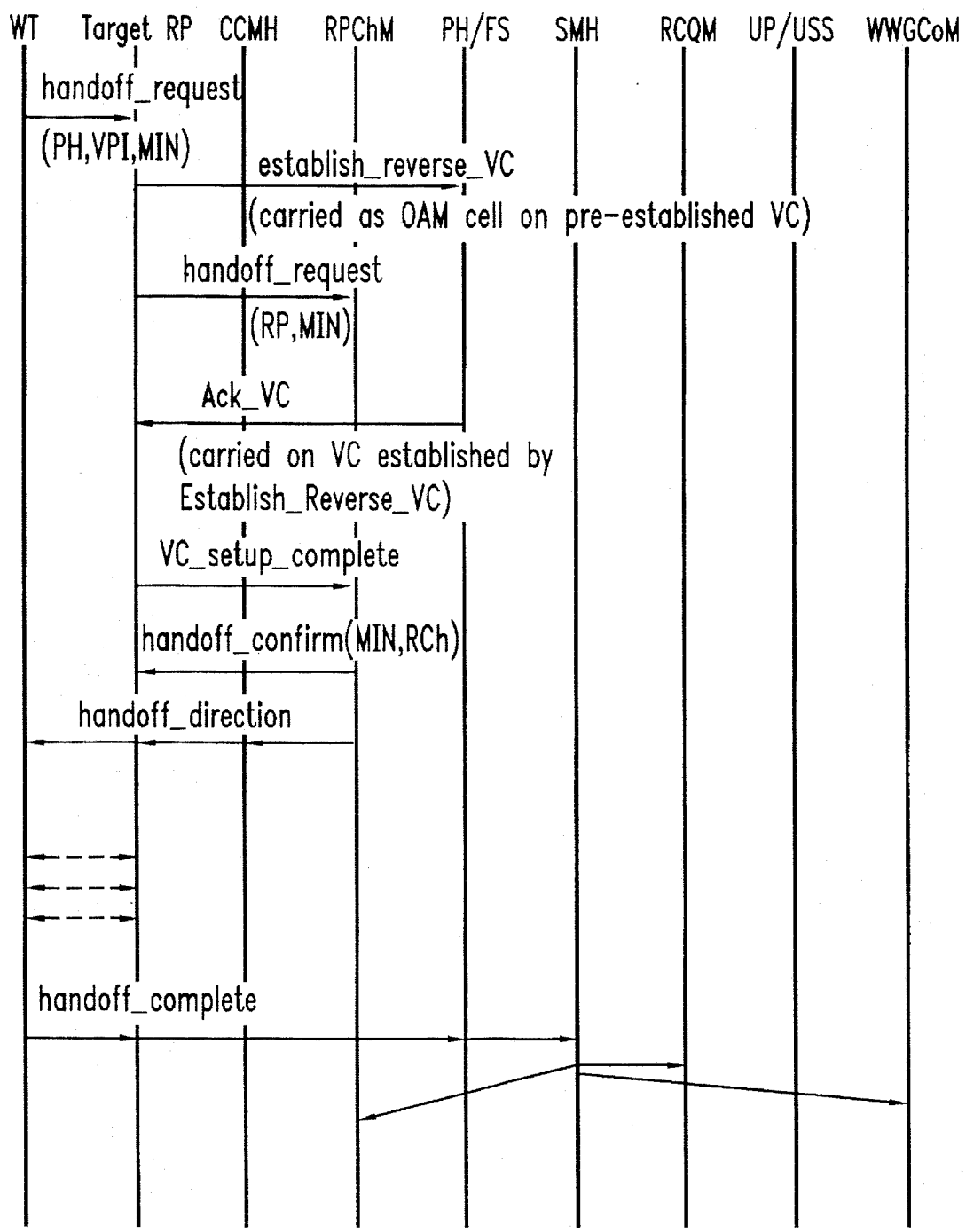
FIG. 17 depicts the timing of the typical message flows for a wireless directed hand-off using pre-established unidirectional virtual channel connections.

The remainder of this section describes three hand-off scenarios in detail that the exemplary embodiment can support. Section 5.2.1 describes a scenario in which the wireless terminal is allotted 3 VC identifiers at call set-up and provides one that is not in use to the Target Radio Port as part of the hand-off_request message. Preferably radio ports that are associated with the Packet Handler serving the wireless terminal have pre-established VCs to the Packet Handler. The germane message flows associated with this scenario are depicted in FIG. 17.

Figure 18:
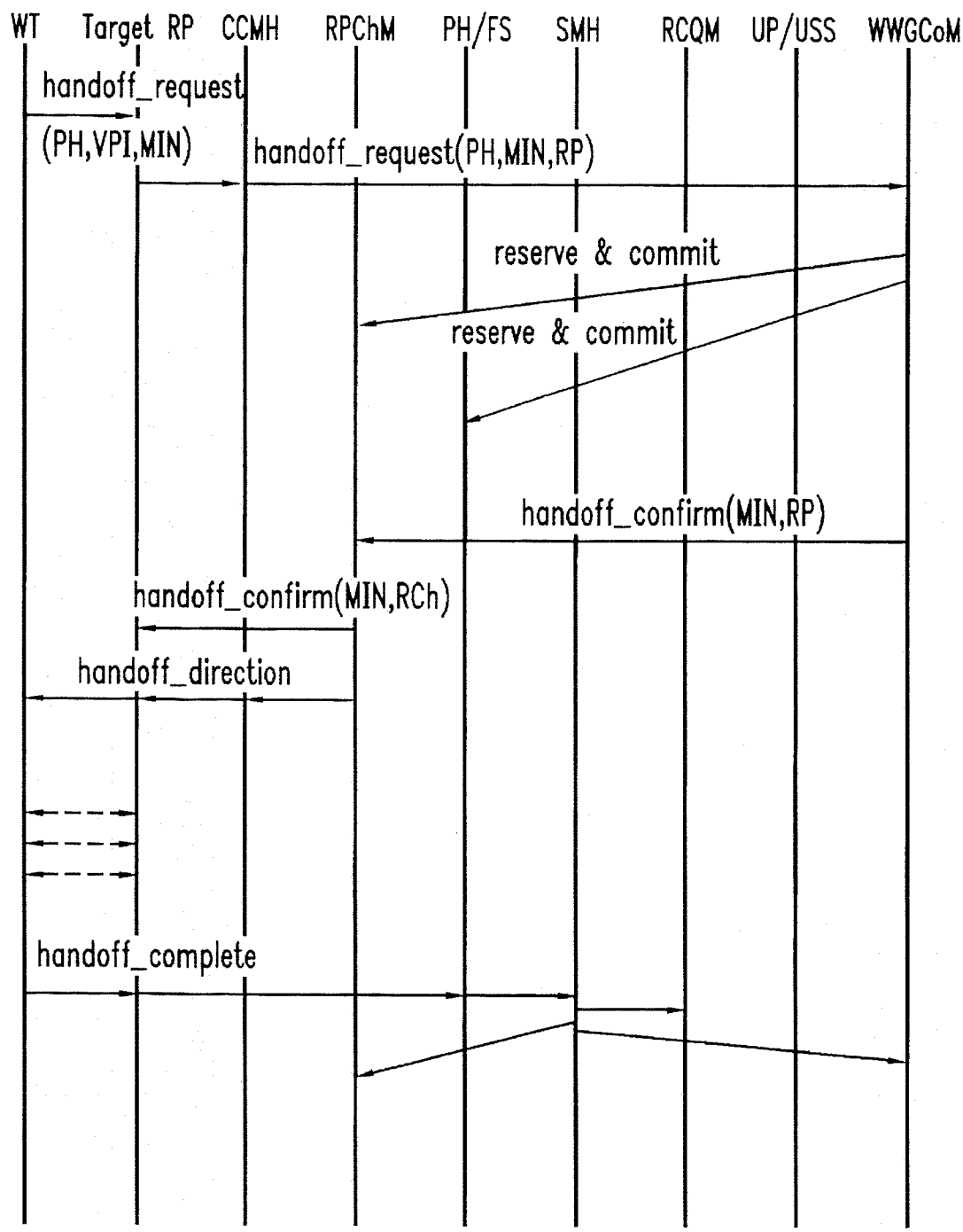
FIG. 18 depicts the timing of the typical message flows for a wireless directed hand-off using pre-established bi-directional virtual channel connections.
Figure 19:
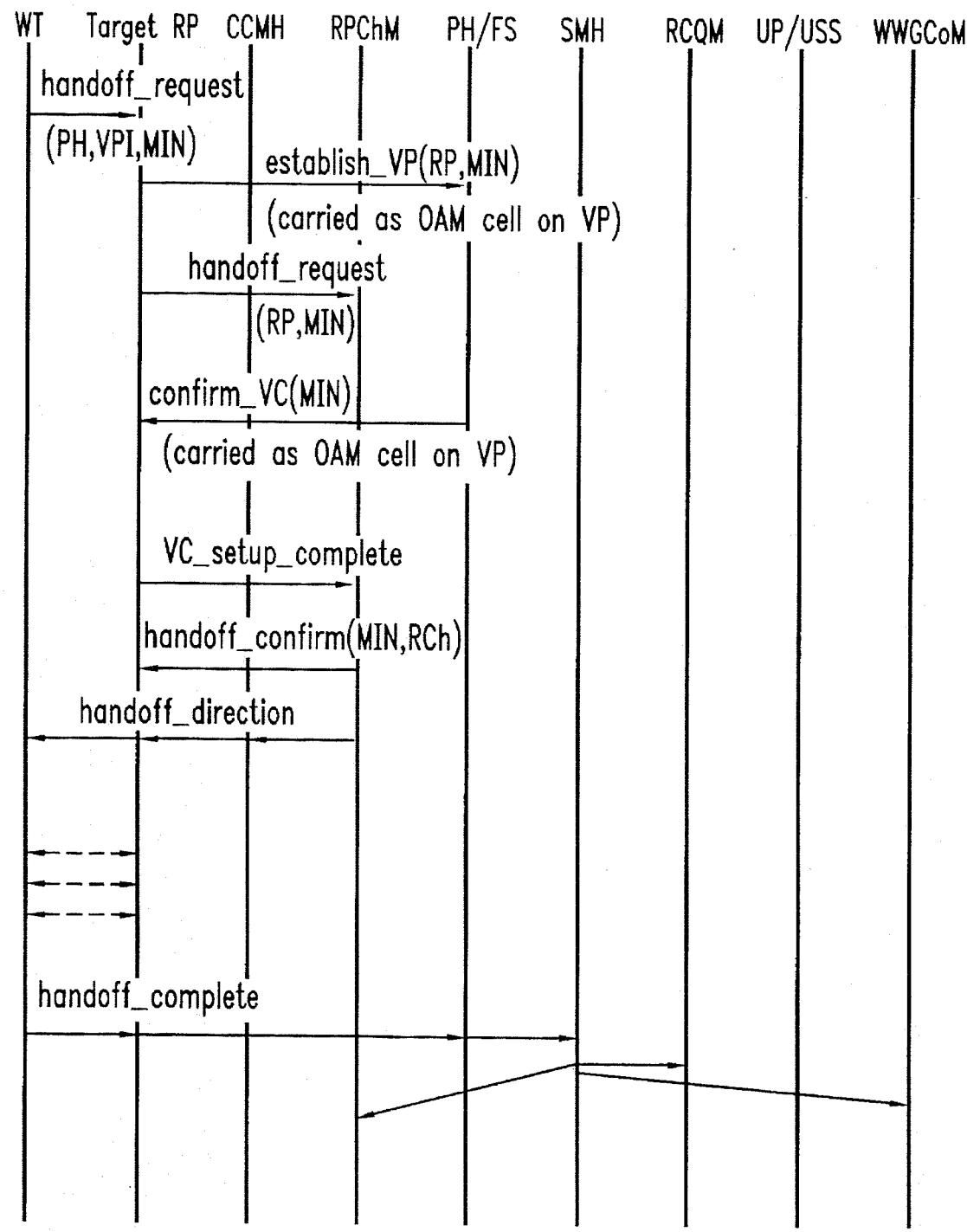
FIG. 19 depicts the timing of the typical message flows for a wireless directed hand-off using no pre-established virtual channel connections.

Section 5.2.2 describes the second scenario where pre-established VPs between the Packet Handler and the associated Radio ports are used. VCs are picked at the time of hand-off. The germane message flows associated with this scenario are depicted in FIG. 18. Section 5.2.3 describes the third scenario in which a complete VP/VC establishment from the Packet Handler to the Target radio port is required at hand-off because the Target radio port is not associated with the Packet Handler (or when the system does not support fast hand-offs. The germane message flows associated with this scenario are depicted in FIG. 19.

5.2.1 Pre-established Unidirectional VCCs

When pre-established uni-directional VCCs are used between a radio port and its associated Packet Handler, the wireless terminals provides the VCI (that is pre-established to the Packet Handler in the uplink direction), in the hand-off_request message. FIG. 17 depicts the timing of the germane message flows for an example of successful hand-off event directed by the wireless terminal for this scenario. The Target Radio Port attaches the VCI it received from the accessing wireless terminal and sends a set_reverse_VC message in a signaling OA&M cell to the radio port multiplexer which routes the OA&M ATM cell to the Packet Handler over the pre-established uni-directional VC connection. ATM technology in particular describes the use of OA&M cells that are intercepted at intermediate network nodes for OA&M purposes. We describe a novel use of these OA&M cells for facilitating fast hand-off.

The OA&M cell is read by the intermediate switches and multiplexers before being forwarded to the next entity on the pre-established VC connection. The down link VC connection establishment is through the ATM routing controller table at each switch or radio port multiplexer, which maps an outgoing downlink VC identifier to each incoming port and incoming VC identifier on the uplink. Resource unavailability on any link and/or processor on this route will result in the rejection of the routing request. In that case, a hand-off_reject message is sent back to the Target Radio Port and then via the Radio Port Channel Manager and Control Channel Message Handler to the wireless terminals.

If resources are available along the entire route, then the hand-off request can be accepted, and the downlink VC identifiers established as the set_reverse_VC OA&M cell traverses the pre-established uplink VCC. At this point an ack_VC OA&M cell is transmitted on the newly established downlink VCC to the radio port. The Radio Port Channel Manager is informed of the establishment of the required duplex VCC between the radio port and the Packet Handler. The Radio Port Channel Manager can now assign a radio channel to the hand-off call and inform the wireless terminal of the acceptance of the hand-off_request using a hand-off_direction message. The hand-off_direction message to the wireless terminal includes voice channel assignment (e.g., Walsh Function in CDMA) information that the wireless terminal uses to decode packets transmitted by the Target Radio Port. This message is transmitted on the Forward Control Channel of the Target Radio Port. After the wireless terminals and the radio port are synchronized on the new Radio Channel, the wireless terminal transmits a hand-off_complete message to the radio port, which is forwarded for information to the Wireless-Wired Gateway Control Manager.

This method results in a "very" fast soft or hard hand-off process whereby no delay is incurred in the uplink direction for connection establishment. The downlink VCC is established while the first ATM OA&M cell is transmitted to the Packet Handler.

5.2.2 Pre-established Bi-directional VPCs

FIG. 18 depicts the timing of the germane message flows associated with preestablished VPCs between each Packet Handler and each associated radio port, where only the VCIs at the end points (e.g., the radio port and Packet Handler) need to be selected when a hand-off_request arrives.

In this scenario, virtual paths (in both directions) between radio ports and the Packet Handler are pre-established. These paths are preferably identified by the VPI field in the ATM cell header. The VCI field in the ATM cell header is then used to identify the particular call or the corresponding hand-off route for a given call. In this case, an OA&M cell on the pre-established VPC between the radio port and the Packet Handler is used to transport an establish_VC request message to the Packet Handler. The Packet Handler Channel Management Subsystem in turn picks a VC identifier and sends a confirm_VC message to the radio port. With the activation of this VCI, a connection is established between the radio port and the Packet Handler. Once the duplex VCC between the radio port and Packet Handler is established, the remainder of the hand-off procedure is completed as described in Section 5.2.1.

5.2.3 Slow Hand-off: No Pre-established Virtual Connections

When either (1) VC/VCs are not pre-established (i.e., fast hand-off is not supported by the embodiment) or (2) the Target Radio Port is not associated with the Packet Handler of the call, then a slow hand-off, which requires complete connection establishment at the time of hand-off_request, can be accomplished through either (1) permanent virtual paths (VPs) established between Packet Handlers, or (2) or a complete VP/VC establishment can be completed at the hand-off request. The timing of the germane message flows associated with the latter is shown in FIG. 19.

As shown in FIG. 19, the hand-off_request is directly forwarded by the radio port via the Control Channel Message Handling Subsystem to the Wireless-Wired Gateway Control Manager. The Wireless-Wired Gateway Control Manager, using standard procedures, contacts the Channel Manager of the Packet Handler carrying the call and the Radio Port Channel Manager to establish a VCC for the call. Once the VCC is established the Wireless-Wired Gateway Control Manager informs the Radio Port Channel Manager to continue with the rest of the hand-off scenario, as in the case of the fast hand-off.

It is understood that the above described embodiments are merely illustrative of the application of principles of the invention and that other arrangements may be devised without departing from the spirit and scope of the invention.

What is claimed is:

1. A method, comprising:

creating a plurality of virtual circuit identifiers, each of which is associated with the others;

transmitting said virtual circuit identifiers to a wireless terminal via a first radio port;

receiving one of said virtual circuit identifiers from said wireless terminal via a second radio port.

2. The method of claim 1 further comprising communicating concurrently with said wireless terminal via said first radio port and with the assistance of one of said virtual circuit identifiers and via said second radio port and a different one of said virtual circuit identifiers.

3. A method comprising:

creating at least a first virtual circuit identifier and a second virtual circuit identifier;

associating said first and second virtual circuit identifiers with each other;

transmitting said first and second virtual circuit identifiers to a wireless terminal via a first radio port as part of a telecommunications call;

receiving one of said first and second virtual circuit identifiers from said wireless terminal via a second radio port during said telecommunications call.

* * * * *